(12) United States Patent
Novik et al.

(10) Patent No.: US 7,620,659 B2
(45) Date of Patent: Nov. 17, 2009

(54) EFFICIENT KNOWLEDGE REPRESENTATION IN DATA SYNCHRONIZATION SYSTEMS

(75) Inventors: Lev Novik, Bellevue, WA (US); Michael Scott Beckerman, Bellevue, WA (US); Michael Ray Clark, Redmond, WA (US); Moe Khosravy, Kirkland, WA (US); Sean Michael Kelley, Sammamish, WA (US); Jörg-Thomas Pfenning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 11/673,415

(22) Filed: Feb. 9, 2007

(65) Prior Publication Data

US 2008/0195759 A1    Aug. 14, 2008

(51) Int. Cl.
    *G06F 17/30*    (2006.01)
(52) U.S. Cl. .............................. 707/201; 707/6; 707/10; 707/104.1; 709/203; 709/204; 709/208; 709/217; 709/227
(58) Field of Classification Search ........................ None
    See application file for complete search history.

(56) References Cited

U.S. PATENT DOCUMENTS

| 4,745,545 | A | 5/1988 | Schiffleger |
| 5,781,908 | A | 7/1998 | Williams et al. |
| 5,892,900 | A | 4/1999 | Ginter et al. |
| 6,317,754 | B1 | 11/2001 | Peng |
| 6,372,974 | B1 | 4/2002 | Gross et al. |
| 6,615,246 | B2 * | 9/2003 | Pivowar et al. ............... 709/214 |
| 6,636,873 | B1 * | 10/2003 | Carini et al. ................. 707/201 |
| 6,643,669 | B1 | 11/2003 | Novak et al. |
| 6,678,882 | B1 | 1/2004 | Hurley et al. |
| 6,810,405 | B1 | 10/2004 | LaRue et al. |
| 6,895,503 | B2 | 5/2005 | Tadayon et al. |

(Continued)

FOREIGN PATENT DOCUMENTS

| WO | WO2005/101200 A1 | 10/2005 |
| WO | WO2005116794 A1 | 12/2005 |

OTHER PUBLICATIONS

Chris Weider, et al., "LDAP Multi-Master Replication Protocol", http://hegel.ittc.ku.edu/topics/internet/internet-drafts/ draft-i/draft-ietf-asid-ldap-mult-mast-rep-02.txt, Dec. 15, 2006.

(Continued)

*Primary Examiner*—Etienne P LeRoux
*Assistant Examiner*—Hung D Le
(74) *Attorney, Agent, or Firm*—Workman Nydegger

(57) ABSTRACT

A variety of flexible conflict resolution policies are provided for loosely coupled devices to implement according to a variety of different synchronization scenarios. Choosing a conflict resolution policy, such as "Most Frequent Updater," "Priority," "PerCent Change," "Arbiter Deadlock Resolution," etc., enables devices to select how and when to resolve such synchronization conflicts. In addition, with reference to a conflict log, a user or synchronizing application can roll back synchronization state to a time before a conflict may have arisen, so that the user or application can undo a resolution of a conflict and/or the user or application can apply an alternative conflict resolution policy moving forward from that time.

18 Claims, 22 Drawing Sheets

U.S. PATENT DOCUMENTS

| | | | |
|---|---|---|---|
| 6,983,293 | B2 | 1/2006 | Wang |
| 7,032,003 | B1 | 4/2006 | Shi et al. |
| 7,103,844 | B2 | 9/2006 | Jones et al. |
| 7,136,945 | B2 | 11/2006 | Gibbs et al. |
| 7,191,218 | B1* | 3/2007 | Innes ................ 709/206 |
| 2002/0059256 | A1 | 5/2002 | Halim et al. |
| 2003/0174838 | A1 | 9/2003 | Bremer |
| 2003/0182319 | A1 | 9/2003 | Morrison |
| 2003/0195851 | A1 | 10/2003 | Ong |
| 2003/0220966 | A1 | 11/2003 | Hepper et al. |
| 2004/0024727 | A1 | 2/2004 | Bowman |
| 2004/0122870 | A1 | 6/2004 | Park et al. |
| 2004/0128324 | A1 | 7/2004 | Sheynman et al. |
| 2004/0128499 | A1 | 7/2004 | Peterka et al. |
| 2004/0153473 | A1* | 8/2004 | Hutchinson et al. ...... 707/104.1 |
| 2005/0015436 | A1* | 1/2005 | Singh et al. ................ 709/203 |
| 2005/0027755 | A1 | 2/2005 | Shah et al. |
| 2005/0044187 | A1 | 2/2005 | Jhaveri et al. |
| 2005/0049993 | A1* | 3/2005 | Nori et al. ................ 707/1 |
| 2005/0071280 | A1 | 3/2005 | Irwin et al. |
| 2005/0172296 | A1 | 8/2005 | Schleifer et al. |
| 2005/0203905 | A1* | 9/2005 | Jung et al. ................ 707/8 |
| 2005/0235018 | A1 | 10/2005 | Tsinman et al. |
| 2005/0240591 | A1* | 10/2005 | Marceau et al. ................ 707/9 |
| 2006/0047776 | A1* | 3/2006 | Chieng et al. ............... 709/217 |
| 2006/0069798 | A1 | 3/2006 | Li et al. |
| 2006/0106879 | A1 | 5/2006 | Zondervan et al. |
| 2006/0106881 | A1 | 5/2006 | Leung et al. |
| 2006/0107330 | A1 | 5/2006 | Ben-Yaacov et al. |
| 2006/0123010 | A1* | 6/2006 | Landry et al. ................ 707/10 |
| 2006/0155778 | A1* | 7/2006 | Sharma et al. ............. 707/201 |
| 2006/0161516 | A1 | 7/2006 | Clarke et al. |
| 2006/0190497 | A1* | 8/2006 | Inturi et al. ................ 707/201 |
| 2006/0190572 | A1 | 8/2006 | Novik et al. |
| 2006/0194596 | A1* | 8/2006 | Deng ................ 455/466 |
| 2006/0215569 | A1 | 9/2006 | Khosravy et al. |
| 2006/0288053 | A1* | 12/2006 | Holt et al. ................ 707/203 |
| 2006/0288344 | A1 | 12/2006 | Brodersen |
| 2007/0100834 | A1* | 5/2007 | Landry et al. ................ 707/10 |
| 2007/0130217 | A1* | 6/2007 | Linyard et al. ............. 707/201 |
| 2007/0271317 | A1* | 11/2007 | Carmel ................ 707/204 |
| 2008/0140835 | A1* | 6/2008 | Bradley et al. ............. 709/225 |
| 2008/0268855 | A1* | 10/2008 | Hanuni et al. ............... 455/445 |

OTHER PUBLICATIONS

"Administrator's Guide", Red Hat Directory Server, Version 7.1, http://www.redhat.com/docs/manuals/dir-server/pdf/ds71admin.pdf, May 2005.

Coatta, et al. A Data Synchronization Service for Ad Hoc Groups. WCNC 2004 / IEEE Communications Society, 0-7803-8344-3/04 IEEE. http://ieeexplore.ieee.org/iel5/9178/29114/01311592.pdf?isNumber=. Last accessed Dec. 12, 2006, 6 pages.

Juszczyk, et al. Web Service Discovery, Replication, and Synchronization in Ad-Hoc Networks. In: Proceedings of the First International Conference on Availability, Reliability and Security (ARES'06). 0-7695-2567-9/06 IEEE. http://www.infosys.tuwien.ac.at/Staff/sd/papers/Web%20Service%20Discovery,%20Replication,%20and%20Synchronization%20in%20Ad-Hoc%20Networks.pdf. Last accessed Dec. 12, 2006, 8 pages.

Advantages of Microsoft Merge Replication for Mobile and Distributed Applications (White Paper). Published: Feb. 2006. http://download.microsoft.com/download/3/d/9/3d93d494-6ad0-4651-86de-09e1bd43d03f/SQL2005MergeComparitive. doc. Last accessed Dec. 12, 2006, 13 pages.

International Search Report and Written Opinion for PCT Application Serial No. PCT/US2008/053356, mailed Jun. 25, 2008, 10 pages.

Liu, et al. A license-sharing scheme in Digital Rights Management http://smealsearch2.psu.edu/cache/papers/Business/1574/http:zSzzSzwww.smartinternet.com. auzSzSITWEBzSzpublicationzSzfileszSz136__zCz24zCz24zCz24__36879zSzP03__043.pdf/a-license-sharing-scheme. pdf/. Last accessed Dec. 12, 2006, 13 pages.

BROGAN. Enhancing Digital Rights Management using the Family Domain. In: Proceedings of the 4thWinona Computer Science Undergraduate Research Seminar, Apr. 20-21, 2004, Winona, MN, US. http://cs.winona.edu/CSConference/2004proceedings/michael.doc. Last accessed Dec. 13, 2006, 7 pages.

Kwok, et al. A License Management Model to Support B2C and C2C Music Sharing. http://wwwconf.ecs.soton.ac.uk/archive/00000143/01/1008.pdf. Last accessed Dec. 13, 2006, 2 pages.

Reti, et al. DiMaS: Distributing Multimedia on Peer-to-Peer File Sharing Networks. MM'04, Oct. 10-16, 2004, New York, New York, USA. ACM 1-58113-893-8/04/0010.http://delivery.acm.org/10.1145/1030000/1027560/p166-reti.pdf?key1=1027560&key2=3172195611&coll=GUIDE&dl=GUIDE&CFID=8691402&CFTOKEN=37061438. Last accessed Dec. 13, 2006, 2 pages.

OA Dated Oct. 2, 2008 for U.S. Appl. No. 11/672,793, 15 pages.

* cited by examiner

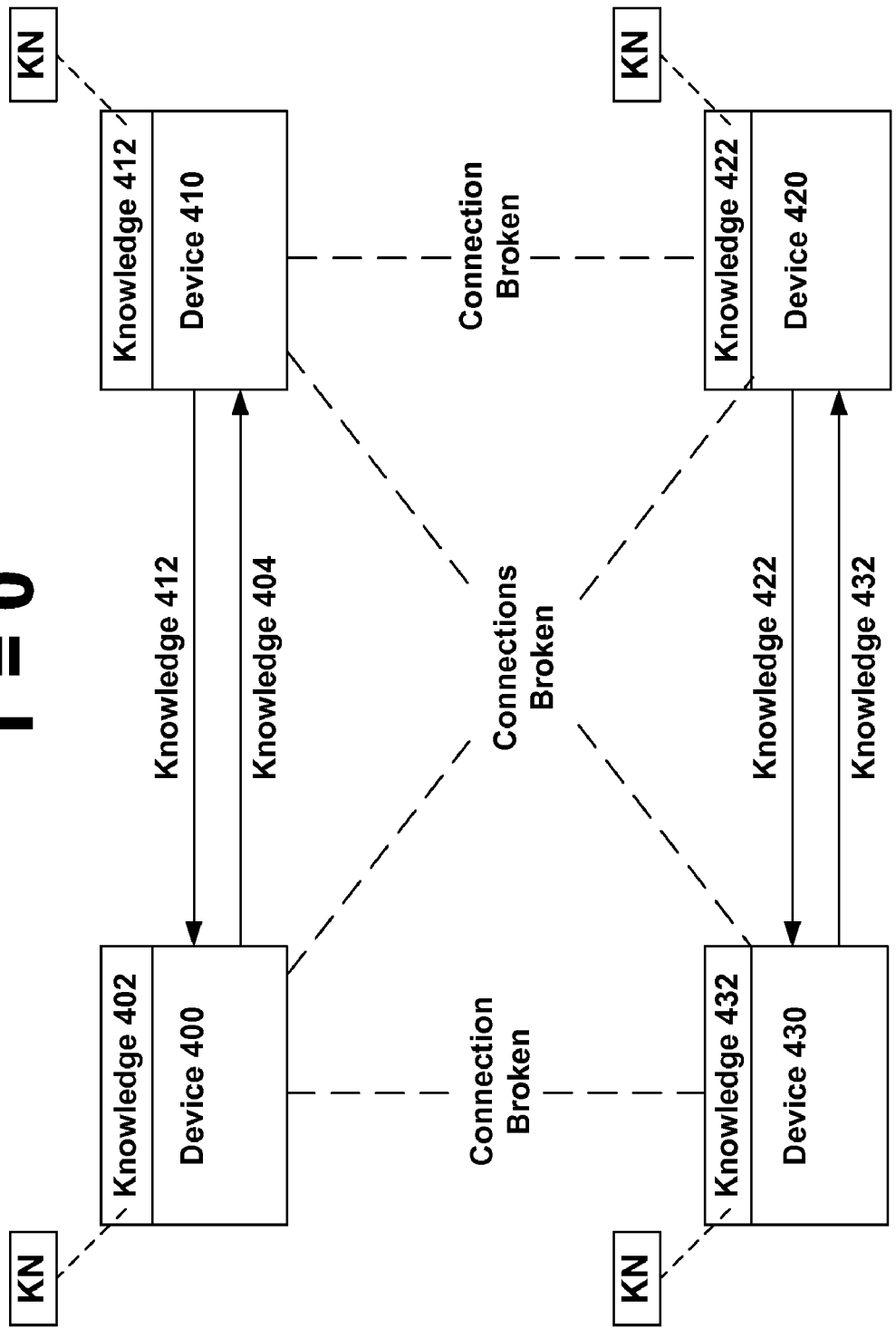

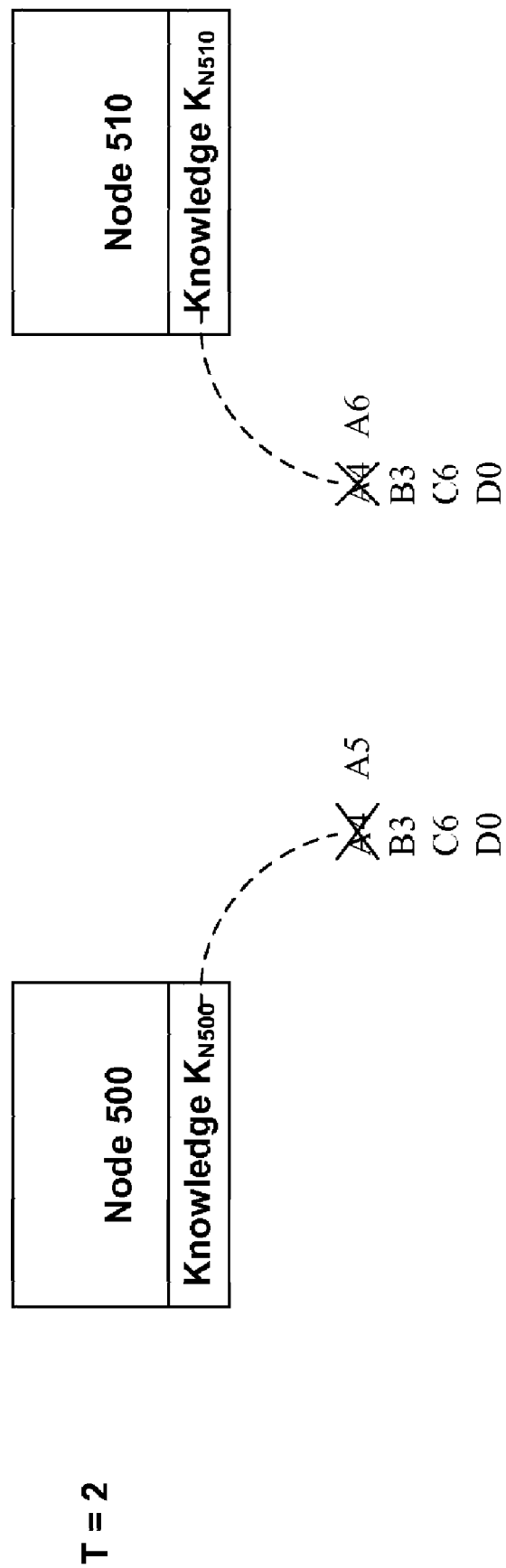

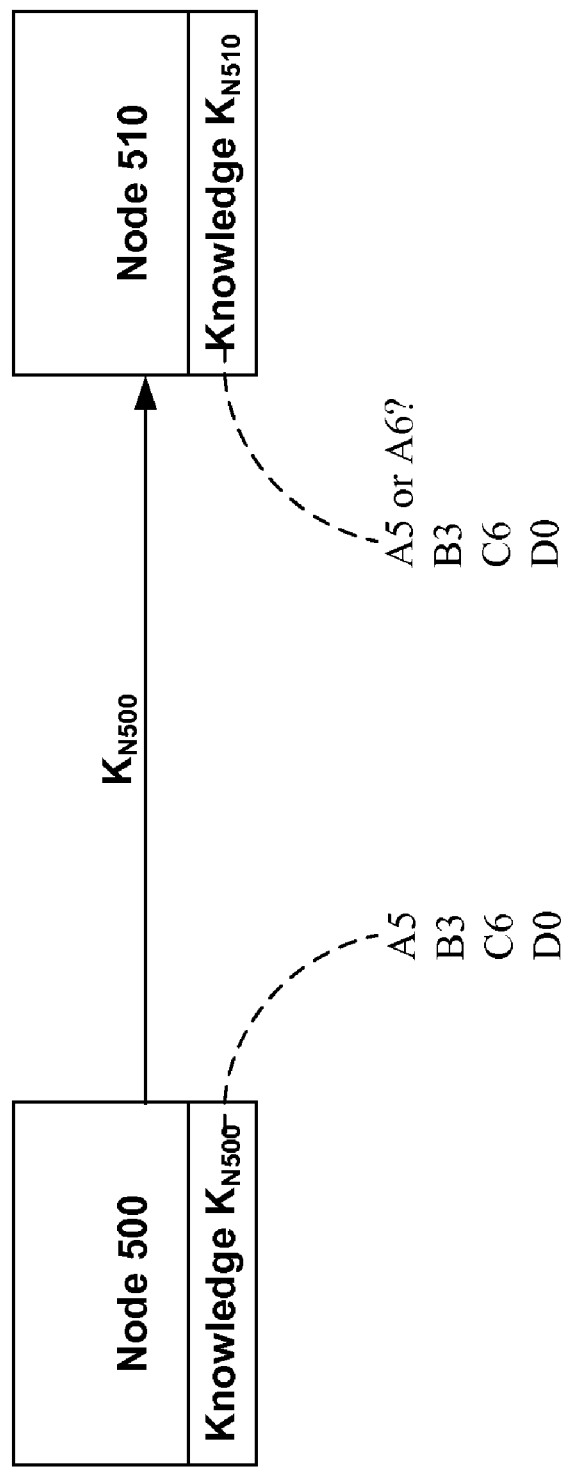

EFFICIENT KNOWLEDGE REPRESENTATION IN DATA SYNCHRONIZATION SYSTEMS

TECHNICAL FIELD

The subject disclosure relates to conflict resolution for multi-master synchronization of data among distributed devices.

BACKGROUND

There are a variety of distributed data systems that have devices and objects that share data with one another. For instance, music sharing systems may synchronize music between a PC, a cell phone, a gaming console and an MP3 player. For instance, email data may be synchronized among a work server, a client PC, and a portable email device. Today, to the extent such devices synchronize to maintain common information wherever changes take place, the synchronization takes place according to a static setup among the devices. However, when these devices are loosely coupled such that they may become disconnected from communications with each other, e.g., when a cell phone is in a tunnel, or when the number of devices to be synchronized is dynamic, it is desirable to have a way for the devices to determine what changes each other device needs when they re-connect to one another, or as they join the network. Moreover, there is a need to determine what conflicts or ambiguities may exist with respect to what data to propagate or replicate to other devices, such as when two different devices independently make changes to respective copies of the same data.

Today, as shown in FIG. 1, there are various examples where a master node 100 synchronizes in a dedicated manner with a client node 110, such as when an email server synchronizes with a dedicated email client. Due to the dedicated synchronization between the two devices, the state of the necessary knowledge 102 to synchronize between the two devices can be tracked by the master node 100. Such knowledge 102 can also optionally be tracked by client node 100 as well. However, when the number of synchronizing devices increases and when the connection between master node 100 and a client node 110 may become disconnected at times, not only does tracking the necessary knowledge across all of those devices become a difficult problem, but the number of conflicts from a synchronization standpoint proliferate as well. This is because the opportunity for different devices to evolve a set of data being synchronized independently increases when the devices increase in number and when they can become easily disconnected.

A problem with current solutions is that they often base their synchronization semantics solely on clocks or logical watermarks for a specific node (e.g., the email server), as opposed to any node. These systems can work well in cases of a single connecting node or master. However, these systems are problematic when the topology or pattern in which the nodes connect changes unpredictably. Moreover, as the situations and circumstances under which a complex set of devices may wish to synchronize data in a loosely coupled network increase, there is an even greater need for flexibility and control over the way that those devices handle conflicts.

With respect to the proliferation of conflicts in a multi-master synchronization scenario, a need for node-independent synchronization knowledge and conflict handling according to a variety of resolution measures arises when computers in a topology can change the way they connect to each other or as the number of computers grows. For instance, with a media player, it might be desirable to synchronize among multiple computers and multiple websites. In most instances, most applications can only synchronize data between a few well-known endpoints (e.g., home PC and media player), in which case a static conflict resolution measure is enforced, e.g., "home PC always wins conflicts." As the device community evolves over time for a user of the media player application, however, the need for data synchronization flexibility for the music library utilized by the devices increases, as does the flexibility with which the devices handle conflicts when synchronizing with one another in various orders.

Thus, any distributed data system that wishes to share common information across multiple loosely coupled devices needs an efficient way to represent what changes to the common information of which they are aware and what changes of which they are unaware, and needs a way to resolve conflicts for such changes when they conflict with one another. For a conceptual illustration of the problem, imagine four friends who each go see a sneak preview of an upcoming movie. Unfortunately, the movie studio has decided to limit distribution of the movie and each friend is limited to seeing only a thirty-minute segment of the movie. When the friends get back together, they have a meeting where each describes the beginning through the end of the segment they watched to attempt to collectively piece together as much of the movie as possible.

If, by chance however, the fourth friend cannot attend the meeting, then the one of the first three friends, e.g., the second friend, who talks to the fourth friend next will attempt to add the collective knowledge of the movie by the first three friends to the knowledge of the movie by the fourth friend. At that time, however, the complete set of knowledge of the movie as between the four friends is understood only by the second and fourth friends. Then, when either of the first friend or third friend encounters either of the second or fourth friend, the first or the third friend will gain the collective knowledge of the movie as well. Synchronization is finally complete when each of the four friends understands the collective knowledge of the movie by the four friends.

However, to show the opportunity for conflict, suppose that the first friend, prior to encountering either the second or fourth friend, talked to a fifth friend, who gave an account of some missing pieces from the movie that differed from what the second or fourth friend later tells the first friend. The first friend will not know which account of the movie to take as the true version of what happened. Often times, the first friend will perform some sort of heuristic guess as to which is the best account. The first friend might take into account length of relationship, history of trust with one friend or another, or other like factors when considering which story to adopt, and which to discard. In other cases, the first friend might remember both accounts for a short while and wait for additional information prior to resolving the conflict. In a similar fashion, it would thus also be desirable to allow devices to synchronize with one another and resolve conflicts as they arise among distributed devices synchronizing data in a loosely coupled system.

In the above example, the movie is analogous to common information to be shared across devices and the friends are analogous to the loosely coupled devices. In this regard, when the friends/devices come back together, what is needed is a mechanism for representing what each of the connected individuals/devices know and do not know, and for resolving conflicts among such knowledge, i.e., for determining "true" knowledge, so that the common information can be pieced together to the maximum extent permitted by the collective knowledge of the individuals/devices. Loosely connected systems of device nodes thus need an efficient way to describe the data they have, where they received and what data they need from another node involved in the conversation, and how to resolve conflicts among the devices.

In short, conflicts are an inevitable problem that arises with 2-way multi-master sync topologies. Users or applications are free to make concurrent modifications to the same item on different endpoints leaving no way for a synchronization solution to be able to determine which change(s) to correctly accept. As discussed, existing conflict resolution policies allow for the automatic resolution of conflicts through the application of some pre-determined policy, such as "last writer wins." However, given the proliferation of different end-point types, a single pre-determined policy is not sufficient to address the myriad of conflict resolution policies that have been identified for a corresponding number of evolving device synchronization scenarios among loosely coupled devices. In this regard, the challenge that is not addressed adequately today is the balancing act of making synchronization applications flexible enough to implement different conflict policies while at the same time making them robust enough to store, apply and rollback these conflicts in a deferred or automated fashion.

Current solutions fall short in regards to flexibility and/or robustness. First, many solutions offer only a handful of popular conflict resolution policies such as last writer wins. This lack of flexibility will quickly become unacceptable as different end-points become popular and users need to synchronize non-traditional types of data. In addition, many applications do not support the ability to apply conflict resolution policies or do not maintain enough conflict meta-data to roll back/forward the changes associated with conflicts in an automated or UI driven fashion.

In this regard, complications arise when attempting to synchronize among loosely coupled devices when there is no mechanism for understanding the collective knowledge of the set of devices, determining the conflicts in such knowledge, and resolving those conflicts according to flexible policies for devices that become connected. Additional detail about these and other deficiencies in the current state of synchronization among loosely coupled devices may become apparent from the description of the various embodiments of the invention that follows.

SUMMARY

In consideration of the foregoing, the invention provides conflict resolution for two-way multi-master synchronization topologies. Where devices of a set of synchronizing devices independently evolve information being synchronized, synchronization conflicts among the versions inevitably arise. The invention provides efficient and flexible ways for a set of devices to select how to resolve conflicts from a set of conflict resolution policies when exchanging knowledge among synchronizing nodes when synchronizing. Exemplary conflict resolution policies include (A) "Most Frequent Updater" (B) "Priority," (C) "% Change," (D) "Deadlock Resolution," (E) "Highest Degree" and (F) "Highest Centrality Closeness."

Conflicts may also be logged in a conflict log to defer conflict resolution until later. In addition, a user or application can roll back synchronization state to a time before a conflict may have arisen, so that the user or application can undo the conflict and/or the user or application can apply an alternative set of conflict resolution policies.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The system and methods for detecting and resolving conflicts for multiple nodes sharing common information in a multi-master environment are further described with reference to the accompanying drawings in which:

FIGS. 4A, 4B, 4C and 4D are block diagrams showing an exemplary sequence of synchronization among a set of devices illustrating exemplary, non-limiting synchronization conflict generation, detection and resolution in accordance with the invention;

FIGS. 5A, 5B and 5C and 5D are block diagrams showing an another sequence of synchronization among a set of devices illustrating exemplary, non-limiting synchronization conflict generation, detection and resolution in accordance with the invention;

DETAILED DESCRIPTION

Overview

Figure 1:
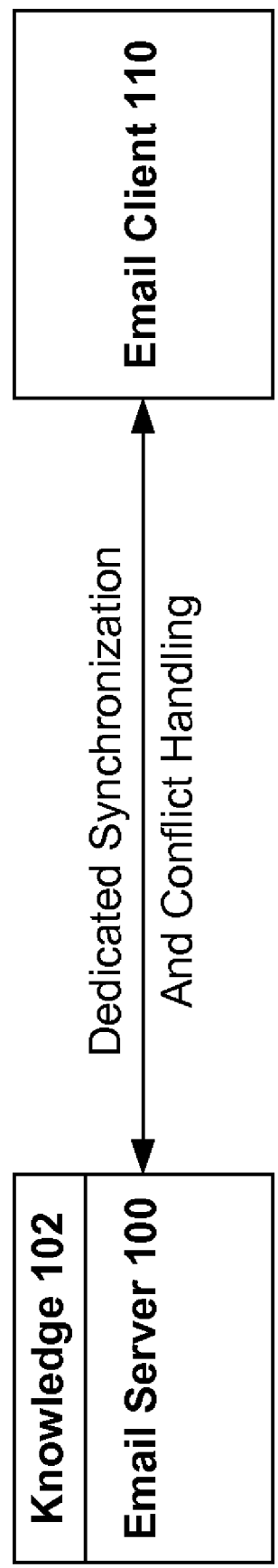
FIG. 1 illustrates a dedicated synchronization system that provides synchronization and conflict resolution between two well defined endpoints of the system.

As discussed in the background, there is no way to efficiently represent synchronization knowledge and also resolve conflicts according to a flexible set of circumstances for a set of loosely coupled devices that do not remain in dedicated contact with one another. Where dedicated contact can be presumed, any changes can immediately or periodically be pushed out to the devices that should receive them, and conflicts can be resolved in accordance with a static policy. Where dedicated contact cannot be presumed, however, with devices appearing and disappearing, efficiently representing what those devices know and do not know from a synchronization standpoint, and resolving conflicts when they arise between devices is desirable.

Accordingly, the invention enables efficient and flexible conflict resolution for distributed devices in data synchronization systems. An efficient mechanism is provided to ensure whenever a device has access to other synchronizing device(s) in a loosely coupled network, the device will exchange knowledge with the other device(s) in order to determine which changes should be retrieved by the device and conveyed to the other device(s), and what conflicts to resolve as part of the synchronization operation according to a flexible set of conflict resolution policies.

In this fashion, while a first device and a third device may never communicate directly, if each is able to connect to a second device and resolve conflicts vis-à-vis the second device, a collective conflict-free share of knowledge can be achieved across all three devices, determining what changes each of the devices should receive from each of the other devices in a manner that resolves any conflicts that are encountered. Considering the proliferation of devices that share data, such as music, email, pictures, videos, advantageously, the knowledge exchange and conflict resolution techniques of the invention are scalable to any number of devices, and any number of independent knowledge bases (i.e., different sets of common information) simultaneously, i.e., anywhere any evolving set of devices wish to share data. Various embodiments of representing such knowledge and resolving conflicts in a distributed system are described in more detail below.

Conflict Resolution for Knowledge Exchange

In various exemplary, non-limiting embodiments described below, knowledge is efficiently represented in data synchronization systems, and where knowledge between devices conflicts from a synchronization standpoint, the invention provides various methods for resolving conflicts among synchronizing devices for different synchronization contexts. Non-limiting benefits that can be achieved with the invention include an efficient exchange of knowledge between connected devices that sends only the minimum data needed by a first node from a second node. The invention includes the ability to efficiently and correctly recognize disagreements over the state of data, i.e., conflicts, between a first node and a second node, the ability to synchronize an arbitrary number of nodes and the ability to synchronize any node via any other node, i.e., the ability to work in a peer-to-peer, multi-master synchronization environment.

Figure 2A:
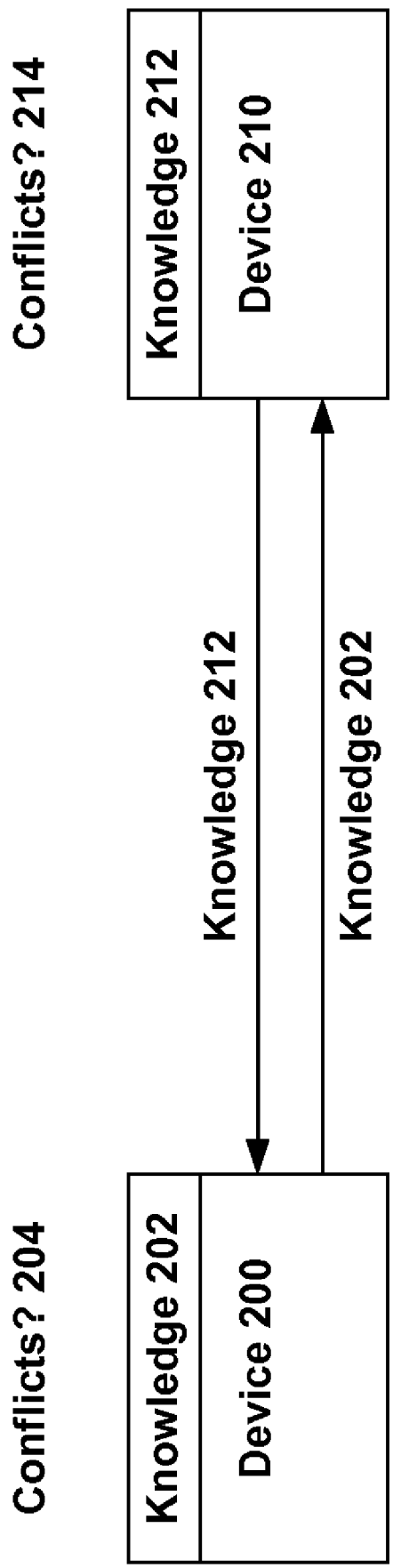
FIG. 2A illustrates exemplary non-limiting knowledge exchange and conflict detection between two nodes of a loosely connected network of nodes in accordance with the invention.

FIG. 2A illustrates, at a high level, a knowledge exchange between two devices 200 and 210 and concurrent or subsequent conflict detection and resolution in accordance with the invention. Any number of changes might be made to some information that is to be shared between the two devices 200 and 210. At any time they become connected, however, by exchanging their knowledge 202 and 212, they become aware of at least the minimum amount of information used to reconstruct what each other knows and doesn't know to facilitate of changes between the devices. It is noted that where more than two devices are involved, knowledge 202 and 212 may be incomplete knowledge of a greater base of information to be shared, but as more knowledge is shared around the multiple devices, collective knowledge continues to be accrued by the devices as they connect to the other devices over time. Conflicts are resolved and the resolution of conflicts is propagated in a like manner.

Advantageously, during the knowledge exchange, conflict detection processes 204 and/or 214 occur to handle conflicts with respect to the evolution of data across different devices. Once a conflict is detected, the devices 200 and 204 may resolve the conflicts at once ensuring that devices 200 and 204 maintain the same data whether originating from device 200 or device 204. Alternatively, the conflicts may be logged in a conflict log for later resolution. Either way, conflict resolution for any conflicts that are detected may be handled via any one or more of a flexible set of conflict policies, described in more detail below.

Figure 2B:
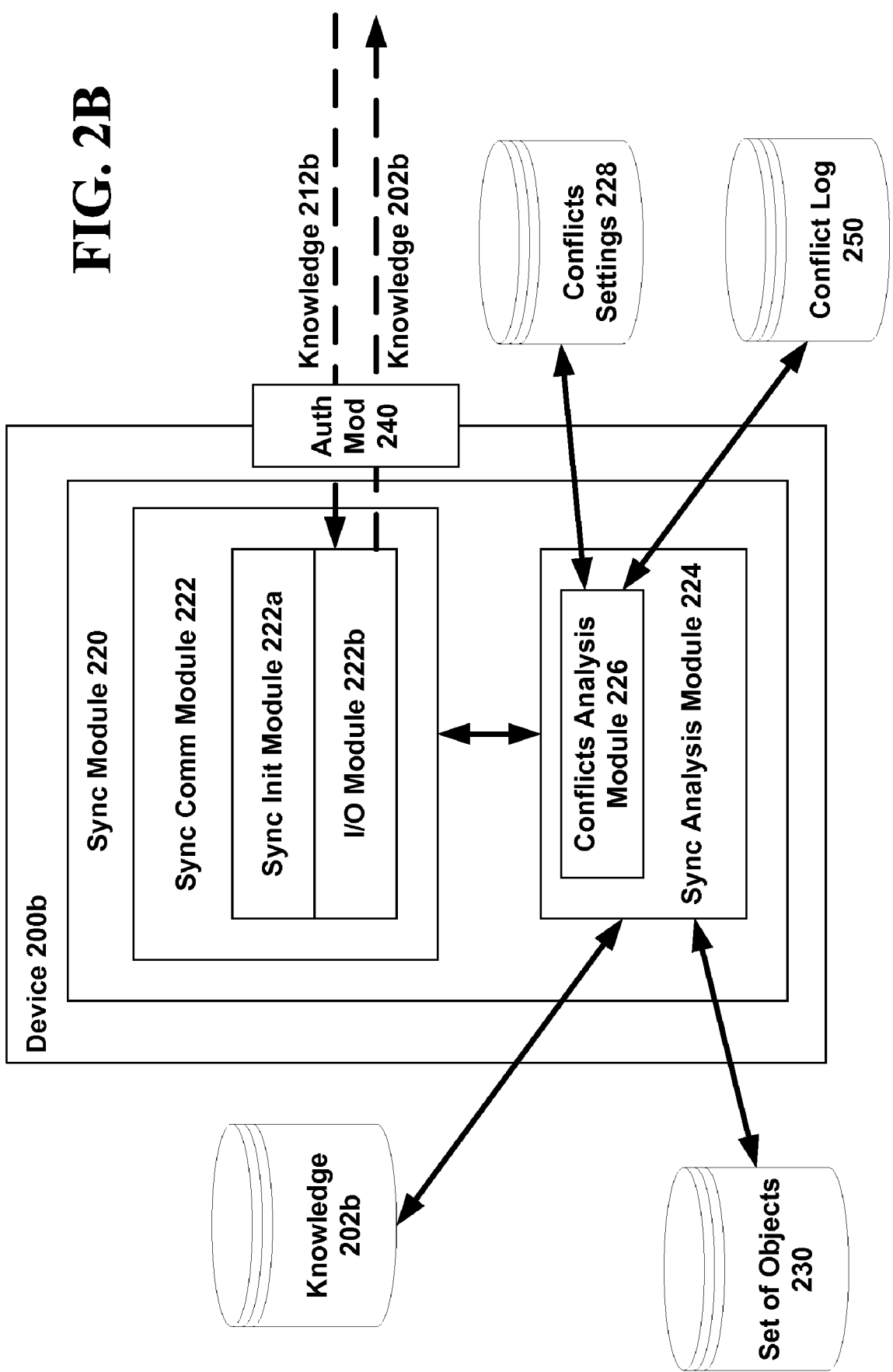
FIG. 2B is a block diagram of an exemplary non-limiting implementation of a device for performing synchronization conflict detection and resolution in accordance with the invention.

FIG. 2B is a block diagram of an exemplary non-limiting implementation of a device 200b for performing a knowledge exchange and conflict detection and/or resolution in accordance with the invention. As shown, device 200b includes a sync module 220 that performs the knowledge exchange techniques for synchronizing a set of objects 230 with another device in accordance with the invention. Sync module 220 may include a sync communications module for generally transmitting and receiving data according to a knowledge exchange.

Sync module 220 may include a sync initiation module 222a which may initiate synchronization with a second device if authorized, e.g., via authorization module 240, and connected to the second device. Sync module may also include an I/O module 222b responsive to the initiation of synchronization by sending knowledge 202b about the set of objects 230 to the second device (not shown) and for receiving back knowledge 212b of the second device and changes to be made to the set of objects 230 originating from the second device. In turn, a sync analysis module 224 operates to apply the changes to be made to the set of objects 230 and to compare knowledge 212b from the second device with the knowledge 202b of the first device in order to determine changes to send to the second device to complete synchronization between the devices.

As shown, sync analysis module 224 of sync module 220 may include a conflict detection and analysis module 226 that operates to handle conflicts according to any one or more of a variety of conflict resolution policies defined for the synchronization context. The conflict detection and analysis module 226 may automatically behave according to conflict settings 228 defined by an administrator of the device, or defined by a synchronizing application, to perform conflict resolution satisfactorily for the synchronization context.

Alternatively, module 226 can operate to detect conflicts when synchronizing and then to store metadata associated with the conflicts in a conflict log 250. The conflicts may then be resolved at a later time, e.g., periodically or in batch format, or according to application or user input for how and when to resolve conflicts. For instance, in a non-limiting embodiment, a user interface (UI not shown) may be presented to the user that presents the conflicts to a user so that the user may select how to resolve the conflicts resulting from synchronization.

Advantageously, the invention operates to perform synchronization for a set of devices all interested in maintaining the latest versions of a set of objects, but also allows such devices to come into connection and out of connection with the other objects of the set. Whenever a device comes back into connection with other device(s) of the set of devices via one or more networks, the device regains collective knowledge that is as up to date as the other device(s) represent with their collective knowledge, and automatically resolves or logs conflicts according to the techniques described herein. In this fashion, even loosely connected devices may come into and out of contact with a set of devices, and then relearn all the knowledge it has missed, while resolving or recording any conflicts encountered, by coming into contact with any set of devices that possesses the latest set of collective knowledge.

Figure 3:
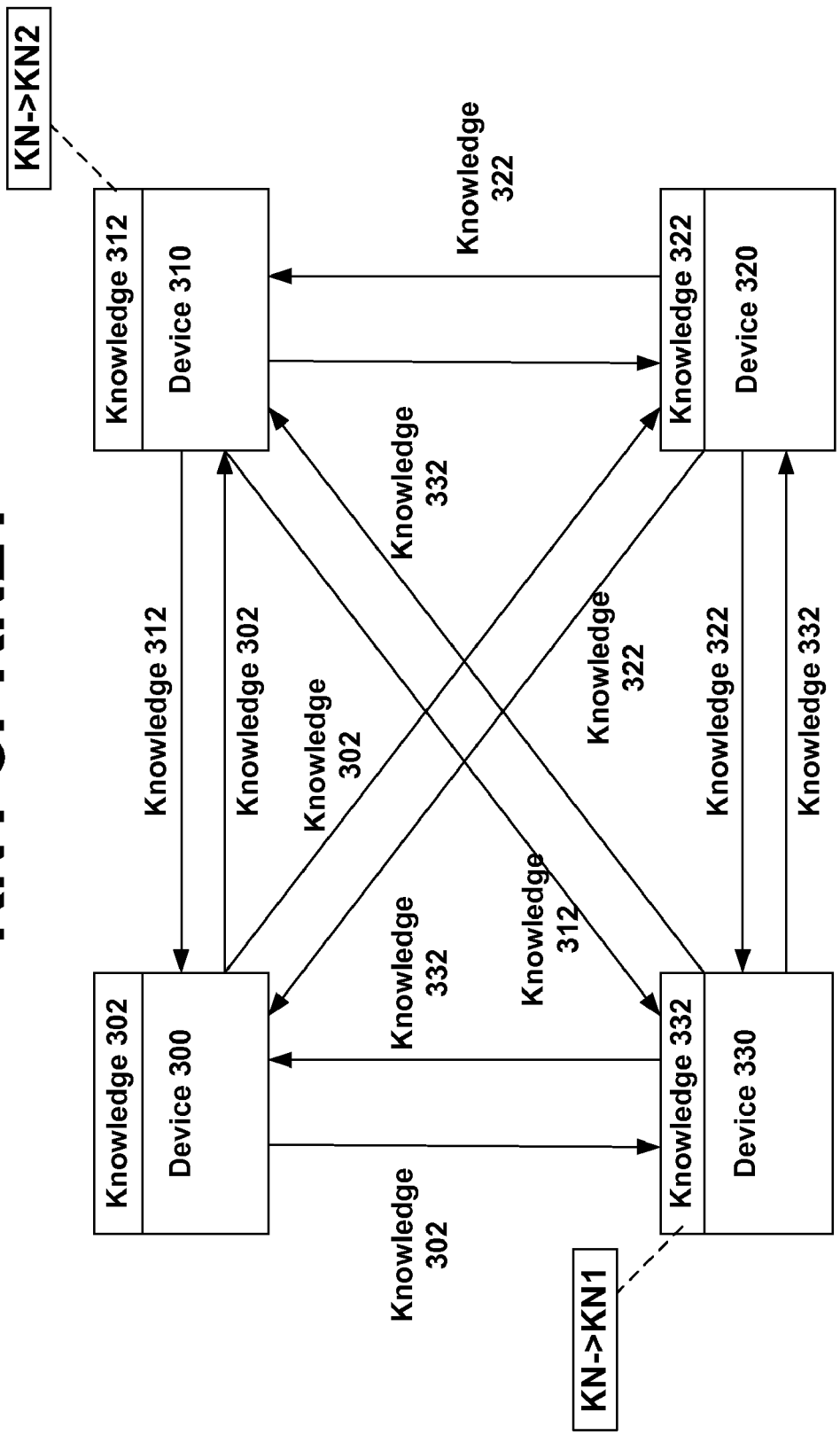
FIG. 3 illustrates exemplary non-limiting knowledge exchange and independent evolution of an object being synchronized among four nodes of a loosely connected network of nodes in accordance with the invention.

FIG. 3 illustrates that the knowledge exchange and conflict resolution of the invention is generalizable, or scalable, to any number of devices. As shown, four devices 300, 310, 320 and 330 are shown with knowledge representations 302, 312, 322 and 332 that respectively indicate what each device knows and doesn't know about a set of common information to be shared across the devices. Advantageously, even where connections in the network become disconnected, a complete set of knowledge can nonetheless be gained by all of the devices 300, 310, 320, and 330, as long as at least one connection directly or indirectly exists to the other devices. For instance, even if the connection between device 330 and device 300 and the connection between device 330 and device 310 become severed, knowledge 332 of device 330 can still reach device 300 via the knowledge exchange with device 320, then via the knowledge exchange between device 320 and 310, and finally via the knowledge exchange between device 310 and 300.

Similarly, in accordance with the invention, if there is a conflict between knowledge 332 and knowledge 302, through the same propagation of knowledge from device 330 to device 320 to device 310 to device 300, the conflict will be resolved among all of the devices when synchronization is complete. For instance, suppose that devices 300, 310, 320 and 330 are all synchronizing an object KN. Where only one device makes a change to object KN, and then that change is propagated to the rest of the devices as part of a synchronization operation, there are no problems. However, because devices are allowed to behave autonomously and independently evolve data, even data being synchronized, device 330 might change object KN to form an updated object KN1, and device 310 might change object KN to form an updated object KN2, different from KN1. When synchronizing the object KN among all of the devices 300, 310, 320 and 330, a conflict arises as to which version of KN to propagate to all of the devices: KN1 or KN2? The invention provides a flexible set of conflict resolution policies for handling such circumstances.

With more devices sharing knowledge about common information to be shared, all of the devices benefit because the knowledge exchange of the invention is agnostic about from which device collective knowledge comes. Much like the scenario described in the background of the invention where three friends exchange movie knowledge and then any one of the three meet with a fourth friend to put the whole picture together, the devices of the invention each independently operates to try to gain as much knowledge about information to be shared among the devices from any of the other devices to which it is connected. Moreover, much like the friends exchanging movie knowledge, if one of the friends appears to have incorrect or otherwise inconsistent information with the collective knowledge, the friends will resolve such inconsistency in a way that is satisfactory to all. For instance, if three friends think events occurred a first way, and only one friend feels it happened differently, the likely result is that the three friends will not adopt the sole account of the way the movie occurred against the weight of the greater evidence.

In turn, much like the scenario described in the background where the second friend meets the fourth friend first, and where only the second and fourth friend share the collective knowledge of all four as a result, the first and third friend nonetheless benefit because it is unknown whether the first friend will see the second friend next or the fourth friend next, but the first friend will learn the collective knowledge from either. The same applies to the third friend. Similarly, connected devices of the invention exchanging common information benefit from any other knowledge accrued by any other connected devices because knowledge is collective per all of the other devices with which each of the exchanging devices has had prior contact. In the same way, connected devices of the invention benefit from any conflict resolution already performed by other devices in that the conflict-resolved data is propagated to the rest of the devices.

In exemplary non-limiting detail, a method is described in further detail for two nodes to engage in a conversation and at the end of the conversation to have equivalent knowledge for the concerned data set. As illustrated above in connection with FIGS. 2A, 2B and 3, the invention is scalable beyond two nodes by creating a knowledge exchange and conflict resolution capability for each new device entering the peer-to-peer network.

Figure 4B:
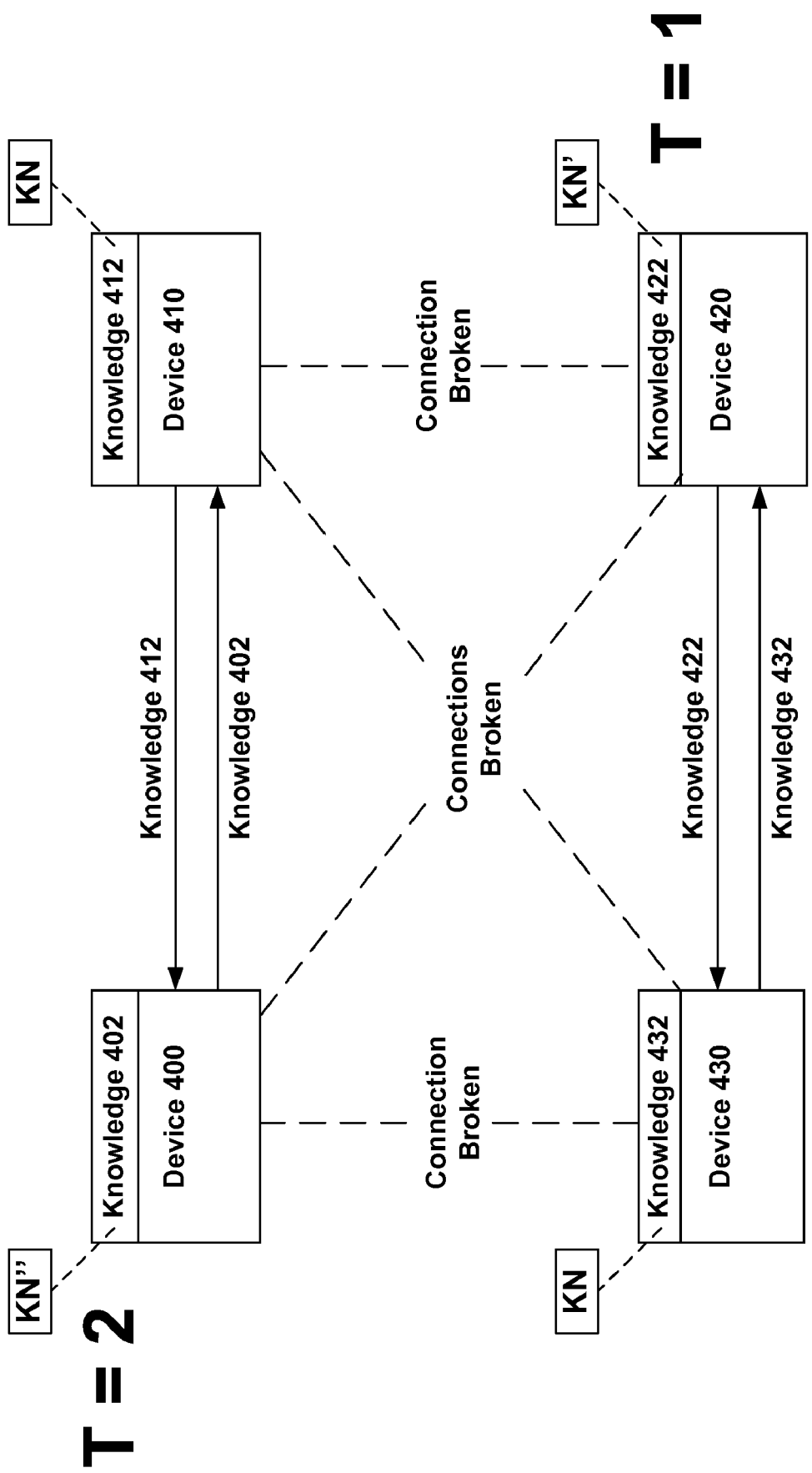

FIGS. 4A to 4D further illustrate the need for conflict resolution for loosely coupled devices that synchronize with one another because loosely coupled devices periodically decouple from one another. As shown in FIG. 4A, at time T=0, there are four devices 400, 410, 420 and 430 with knowledge 402, 412, 422 and 432, respectively, each of which has knowledge of the same version of an object KN. However, all connections between devices 400 and 410, and devices 420 and 430 have become severed, e.g., device 430 is a laptop and device 420 is a cell phone, and the owner of the two goes underground temporarily interrupting connectivity to devices 400 and 410.

Figure 4C:
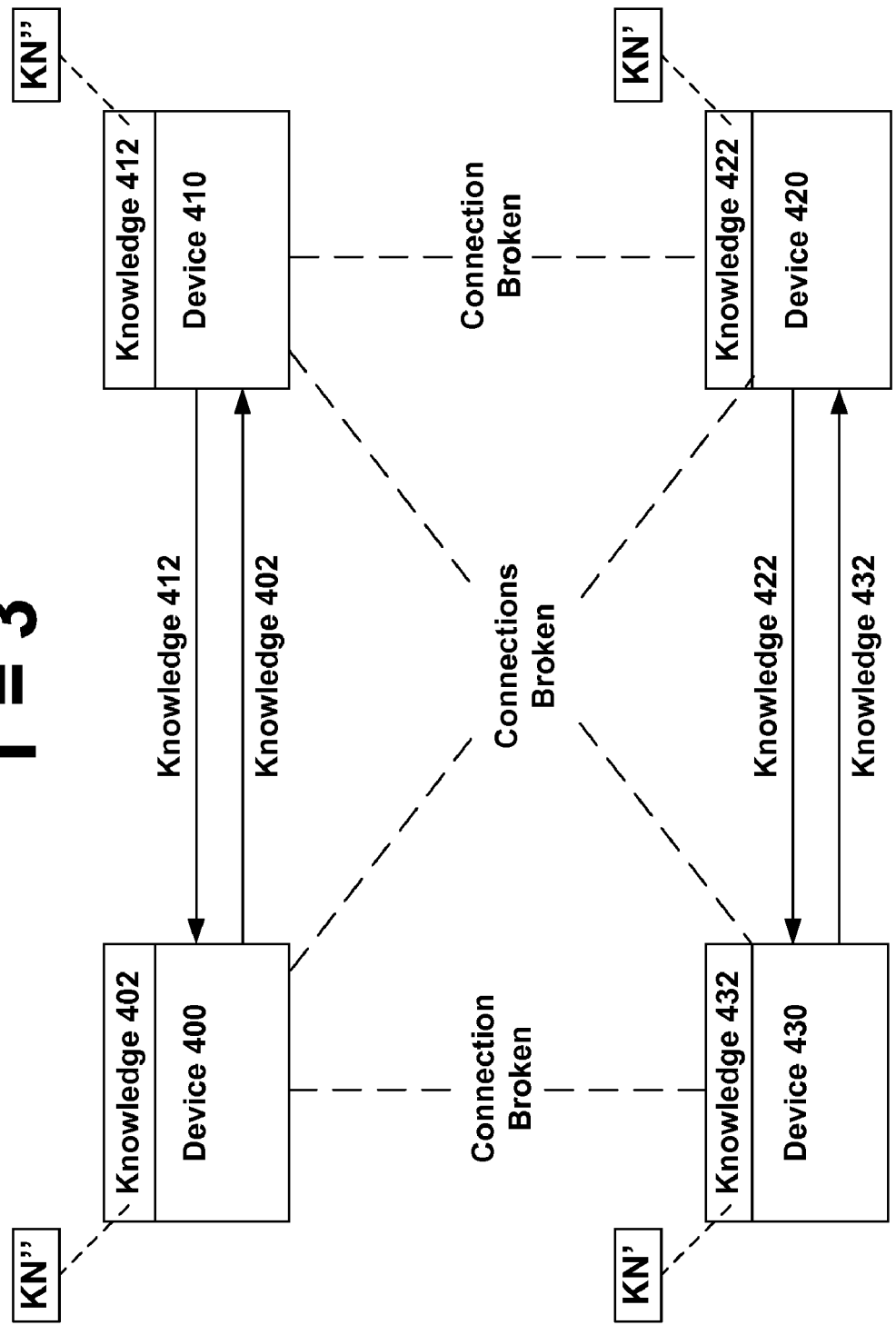

FIG. 4B illustrates that at any time, e.g., time T=1>0, device 420 may make a change to object KN of knowledge 422 from KN to KN'. Similarly, at some time T=2>0, device 400 might also make a change to object KN of knowledge 402, changing the object from KN to KN". In such case, devices 420 and 400 present a conflict when the devices become reconnected, i.e., which version to propagate, KN' or KN"? FIG. 4C shows that some limited synchronization may occur prior to conflict resolution, e.g., at time T=3>2 & >1. For instance, since device 430 is connected to device 420, object KN' is propagated via synchronization to knowledge 432 of device 430. Similarly, since device 400 is connected to device 410, object KN" is propagated via synchronization to knowledge 402 of device 400.

Figure 4D:
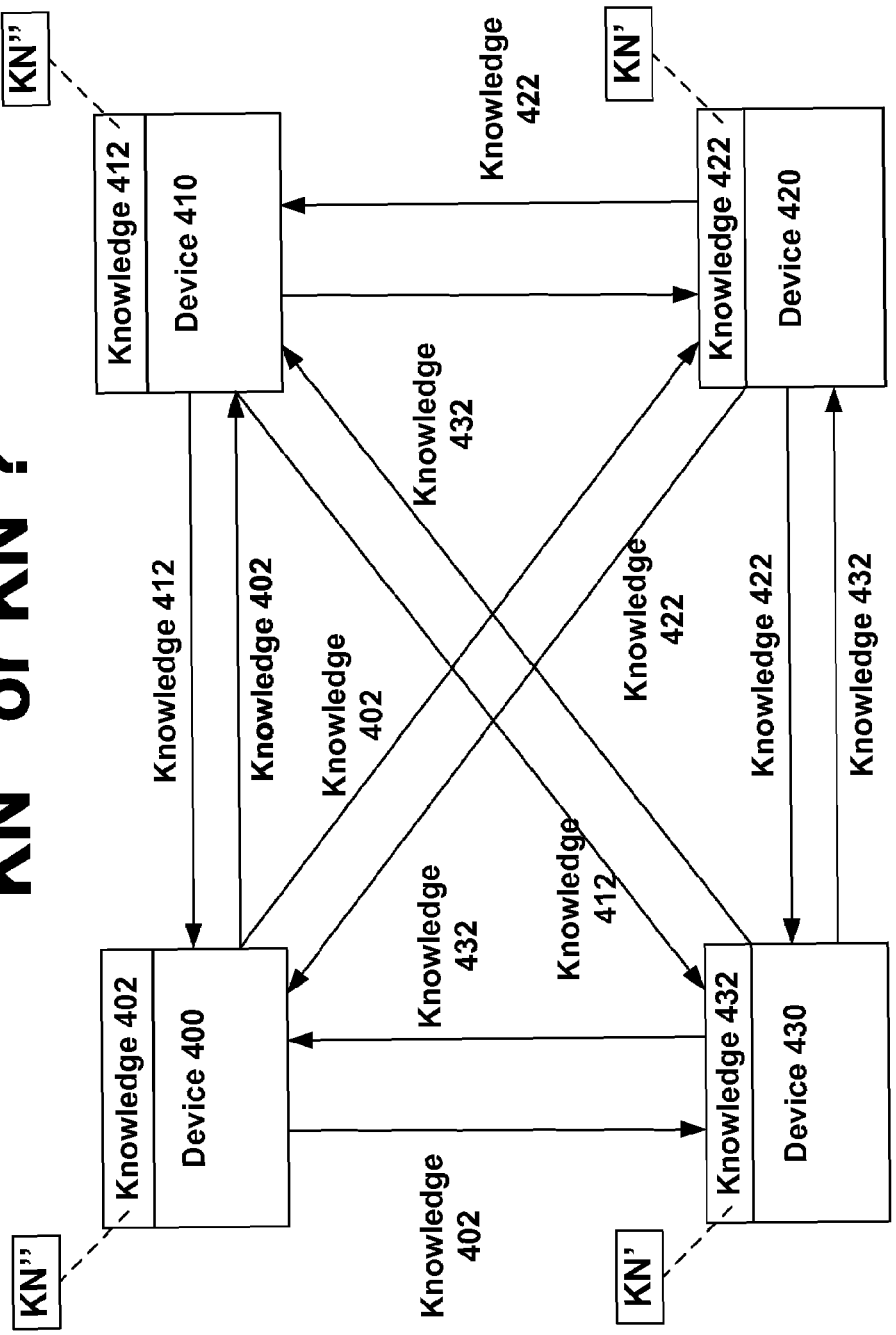
Figure 5A:
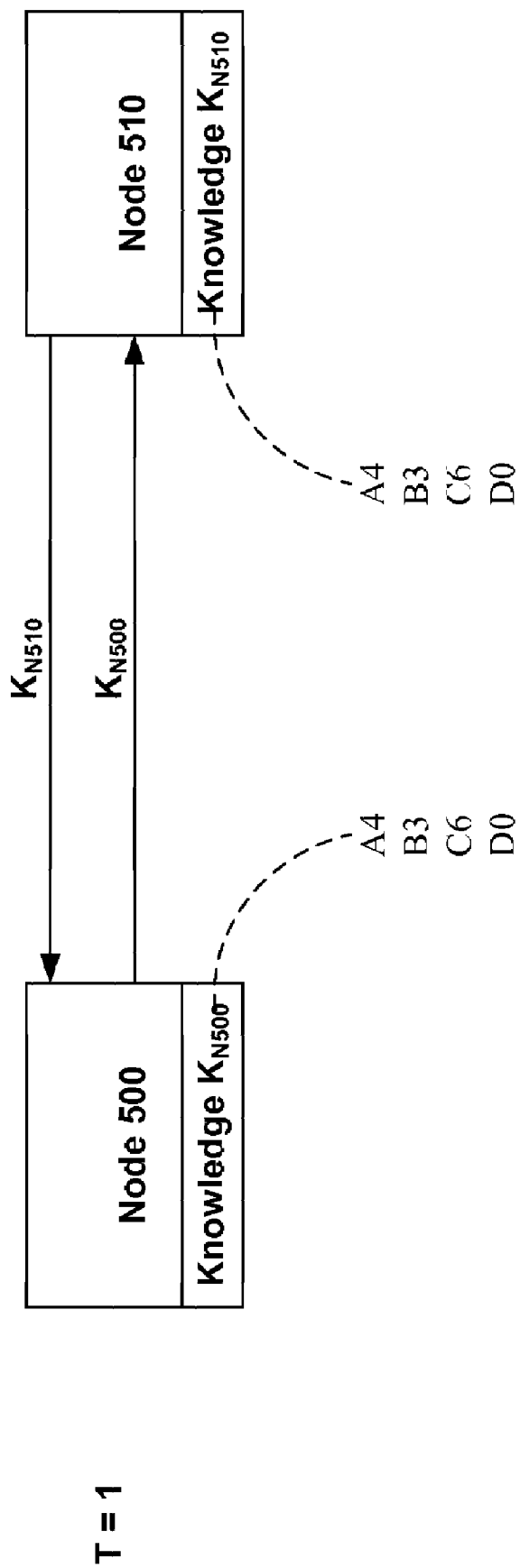
Figure 5C:
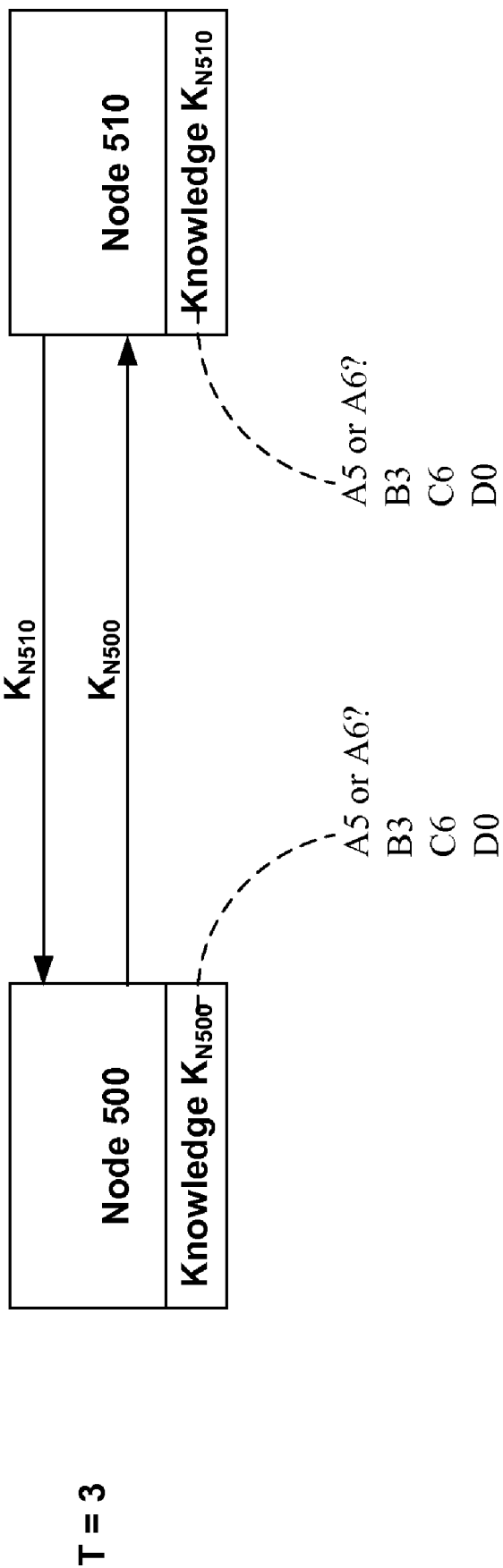

At time T=4, as shown in FIG. 4D, once any of devices 400 or 410 becomes connected again to either of devices 420 or 430, the conflict will present itself. It will not be clear during synchronization what the correct knowledge to propagate is: KN' or KN". Accordingly, a conflict resolution mechanism must be provided to resolve the conflict. As mentioned, the conflict, once detected, can be resolved immediately according to a conflict resolution policy adopted for the synchronization context, or the conflict can be logged for later resolution (e.g., batch conflict resolution, manual resolution, delayed resolution to wait for additional information to help decide, etc.).

FIGS. 5A to 5D illustrate a more concrete sequence between two nodes of a multi-master synchronization scenario, though for the avoidance of doubt, the invention applies to any number of devices that may be synchronizing in a loosely coupled fashion. As shown in FIG. 5, node 500 of a peer-to-peer network having any number of nodes wants to exchange data with Node 510. In the example shown, exemplary knowledge of a device or node is represented by labeling each object to be shared among devices with a letter identifier, and then the trailing number represents the latest version for this object. At time t=1, node 500 and node 510 have synchronized knowledge $K_{N500}$ and $K_{N510}$, respectively, which consists of objects including the $5^{th}$ version of A, the $4^{th}$ version of B, the $7^{th}$ version of C and the $1^{st}$ version of D. Having exchanged their knowledge, nodes 500 and 510 are in a synchronized conflict-free state.

At t=2, however, nodes 500 and 510 independently evolve object A. For simplicity of representation, node 500 creates the $6^{th}$ version of A, and node 510 creates the $7^{th}$ version of A (or vice versa). At time t=3, as a result of a subsequent synchronization process, it is unclear whether the $6^{th}$ or $7^{th}$ version should be kept as the common object between node 500 and node 510. Thus, a conflict resolution mechanism is desirable.

In addition, for any knowledge exchange, there is a transfer of node 500's knowledge $K_{N500}$ to node 510, and also a transfer of node 510's knowledge $K_{N510}$ to node 500. However, for conflict detection purposes, as shown in FIG. 5D, the conflict can be detected after just one transfer of knowledge in one direction. Accordingly, in one embodiment of the invention, the entire knowledge exchange need not be completed prior to initiating conflict detection and resolution. As shown in FIG. 5D, if node 500 sends knowledge $K_{N500}$ to node 510, node 510 can detect that there is a conflict between object A5 originating from node 500 and object A6 originating on node 510. If the conflict is then resolved by node 510, this can save node 500 from performing the same conflict detection since node 510 can dictate to node 500 what the correct version of object A is. Alternatively, it may be desirable for each device to perform conflict resolution differently, in which case both nodes 500 and 510 can carry out independent conflict detection and resolution.

Conflict Resolution for Knowledge Exchange

Exemplary conflict resolution policies that may be implemented in connection with a knowledge exchange among nodes of a distributed multi-master synchronization environment are shown in the flow diagrams of FIGS. 6A to 6E. In each of FIGS. 6A to 6E, different policies are enumerated that reflect different synchronization contexts. When different devices are loosely coupled, and different types of data are being synchronized among them, one may consider that a variety of choices might make sense for a given context in order to resolve conflicts.

Figure 6A:
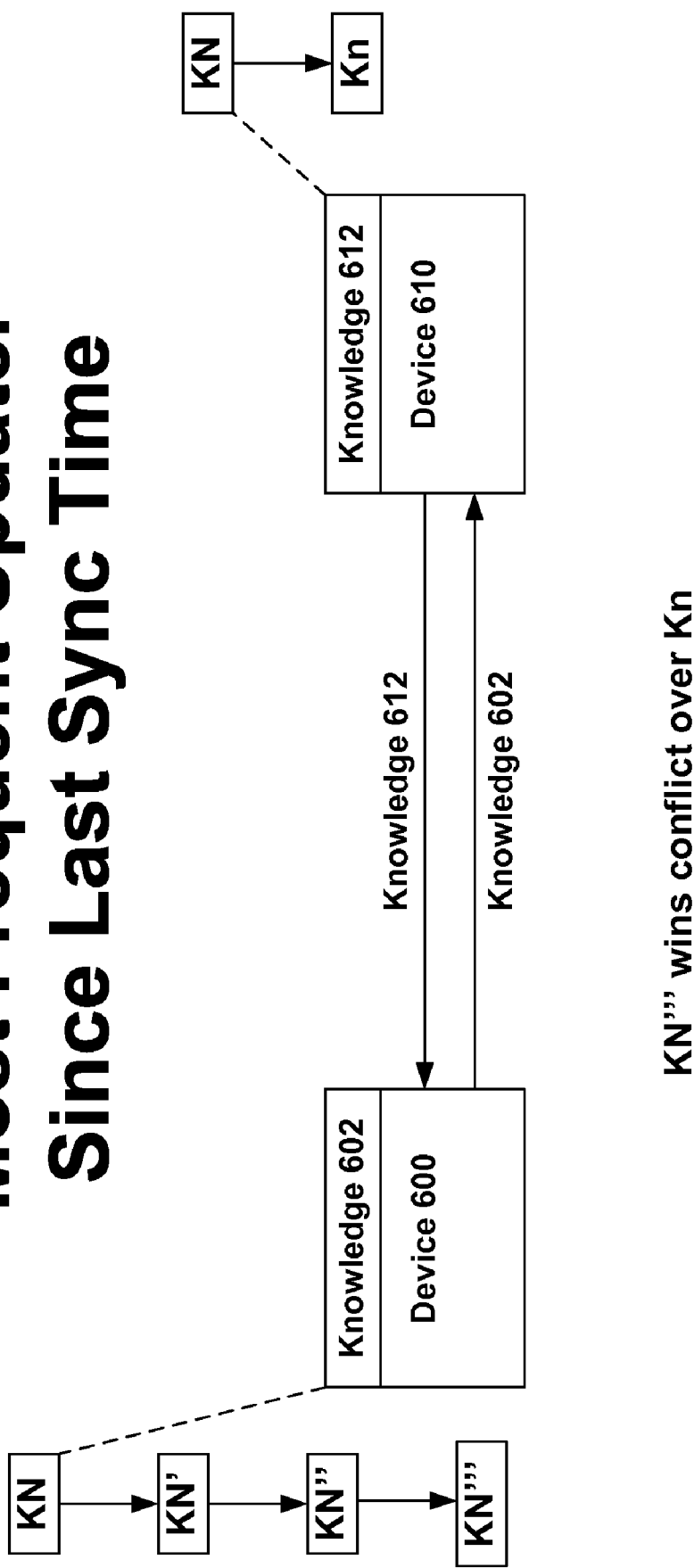
FIGS. 6A, 6B, 6C, 6D, 6E and 6F are exemplary non-limiting block diagrams showing a variety of synchronization conflict resolution policies that may be implemented by a device in accordance with the invention.

For instance, as shown in FIG. 6A, devices 600 and devices 610 initially represent an object KN as part of knowledge 602 and 612, respectively. Then, as shown by the evolutionary flow, changes occur to the copy of object KN on device 600 to evolve the object KN to KN', then again to KN'' and again to KN'''. In parallel, device 610 evolves the object KN to Kn. Thus, when device 600 synchronizes with 610 again, there is a conflict between the version KN''' on device 600 and the version Kn on device 610. In accordance with one policy that may be implemented for resolving conflicts in accordance with the invention, the most frequent updater since the last synchronization time is selected to "win" the conflict. In this case, node 600 updated object KN three times to reach version KN''' in contrast to only one change that occurred at device 610 to reach Kn. Thus, where the most updates since a prior synchronization serves to resolve the conflict for a given context, this is an apt policy to implement. For instance, where a document collaboration is being handled via synchronization, and one user has made many changes to a document at many different times, whereas another collaborator has only made one change to the document, it may make sense to have the changes made by the most frequent updater resolve the conflict.

Figure 6B:
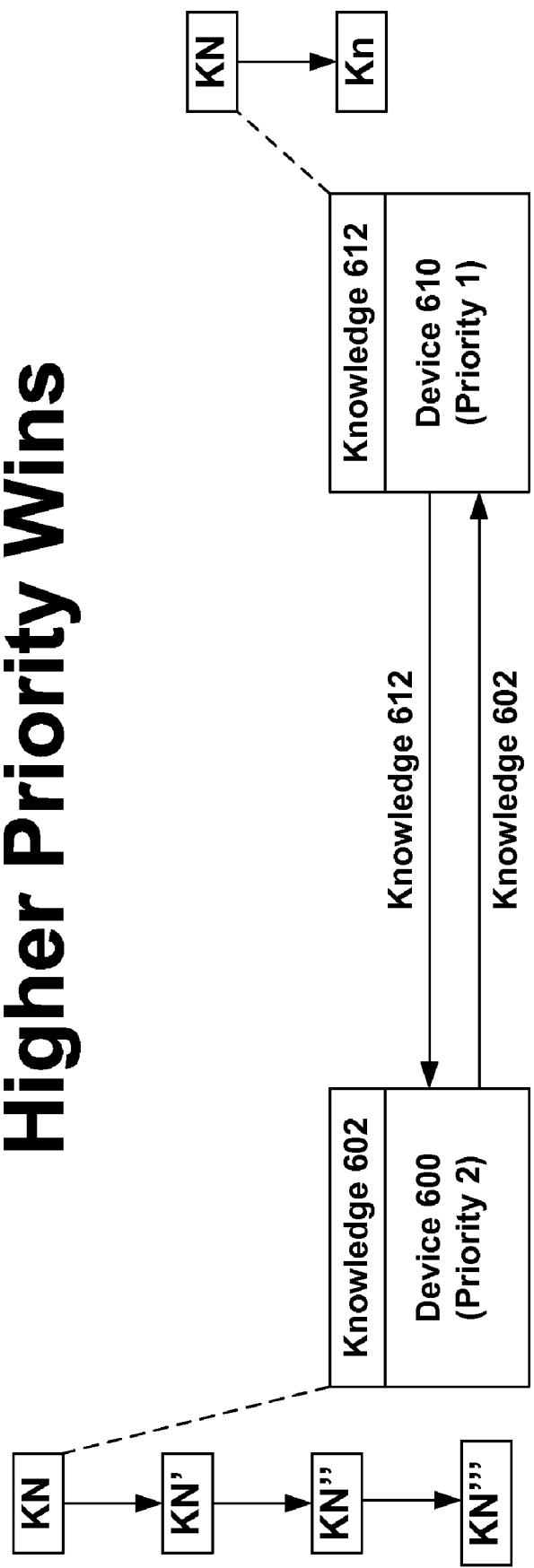

FIG. 6B illustrates another way to resolve conflicts in accordance with the invention. Considering the same circumstances of FIG. 6A, where device 600 evolves object KN to KN''' after three separate changes and where device 610 evolves the data from object KN to Kn, a policy of "higher priority wins" is applied. In this case, device 610 is assigned priority 1 and device 600 is assigned priority 2. Since priority 1 is higher than priority 2, the changes made by device 610 resolve the conflict. For instance, this may be useful where the sanctity of an item of data is imperative from the perspective of a device owner in which case the device owner does not want for third party changes to trump the device owner's changes. The device owner would be assigned the highest priority and third party devices would be assigned lower priority. For the avoidance of doubt, one can imagine a myriad of other circumstances that might also cause one to assign different priorities to different devices of a set of distributed devices.

Figure 6C:
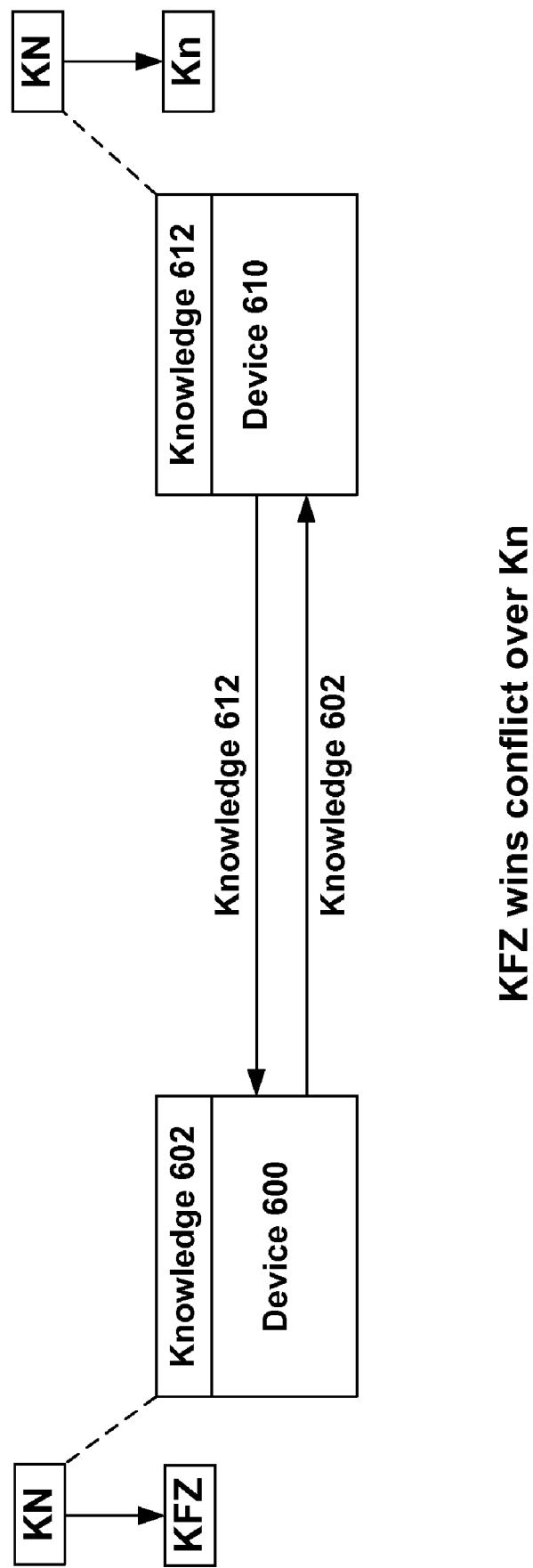

FIG. 6C illustrates another way to resolve conflicts in accordance with the invention. In this case, device 600 evolves object KN to a version KFZ and device 610 evolves object KN to version Kn. In this embodiment, the invention determines the amount or percentage of change that has occurred to the respective objects in order to resolve the conflict. A policy is then applied that favors the changes where they are most voluminous. For instance, a change from KN to KFZ is more substantial of a change than a change from KN to Kn. Accordingly, the changes of device 600 resolve the conflict. Such a policy might be useful to resolve conflicts where no other policy governs conflict resolution. For instance, where a document has changed 90% from its original form on one device, but only 1% on another device, it may make sense to favor the more substantial changes since they are more difficult to recover in the event of an error in conflict resolution. Again, other contexts may apply that would dictate synchronization conflict resolution according to the highest percentage of change.

Figure 6D:
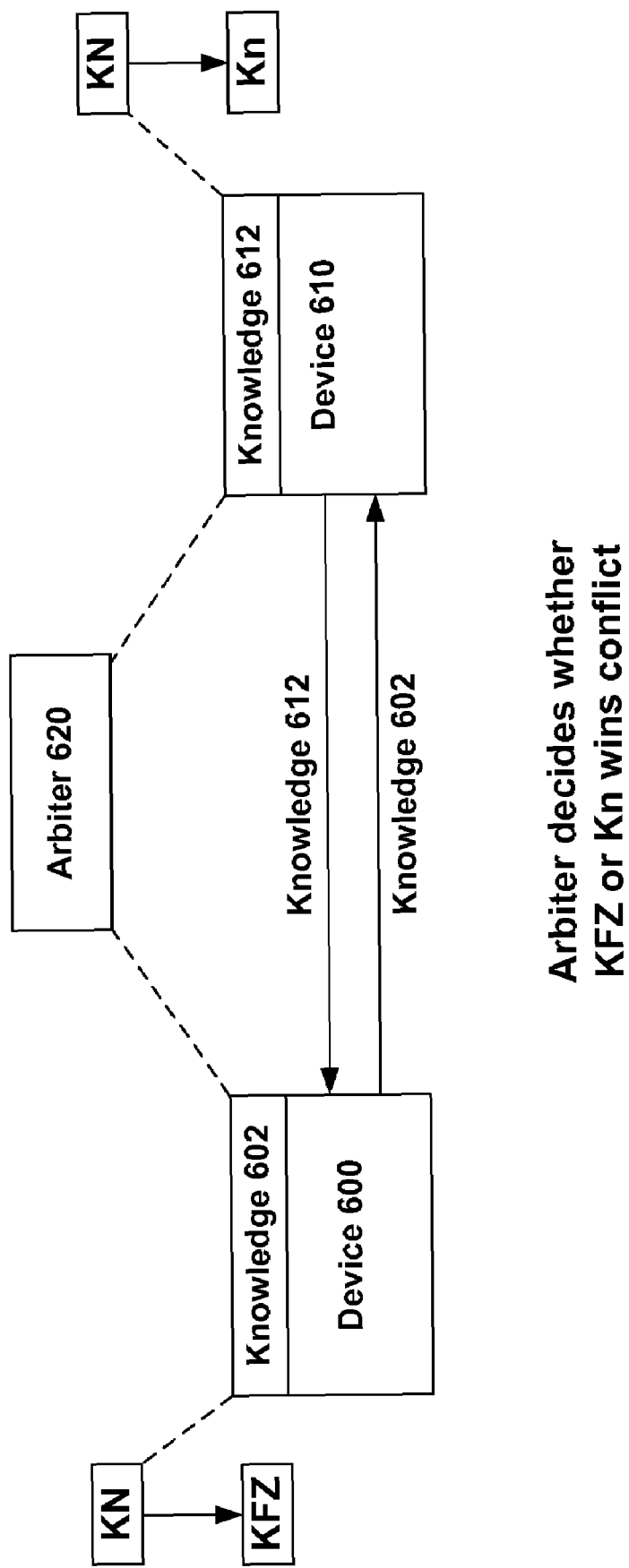

FIG. 6D illustrates yet another embodiment of the conflict resolution of the invention where an arbiter 620 resolves the conflict between KFZ and Kn. Arbiter 620 may be provided as a third party component for resolving conflicts, or it may be incorporated into either device 600 and/or device 610. Arbiter 620 may decide according to any policy and parameters, and may decide dynamically based on current conditions or synchronization state. An arbiter 620 may be useful for synchronization contexts where flexibility is desired.

Figure 6E:
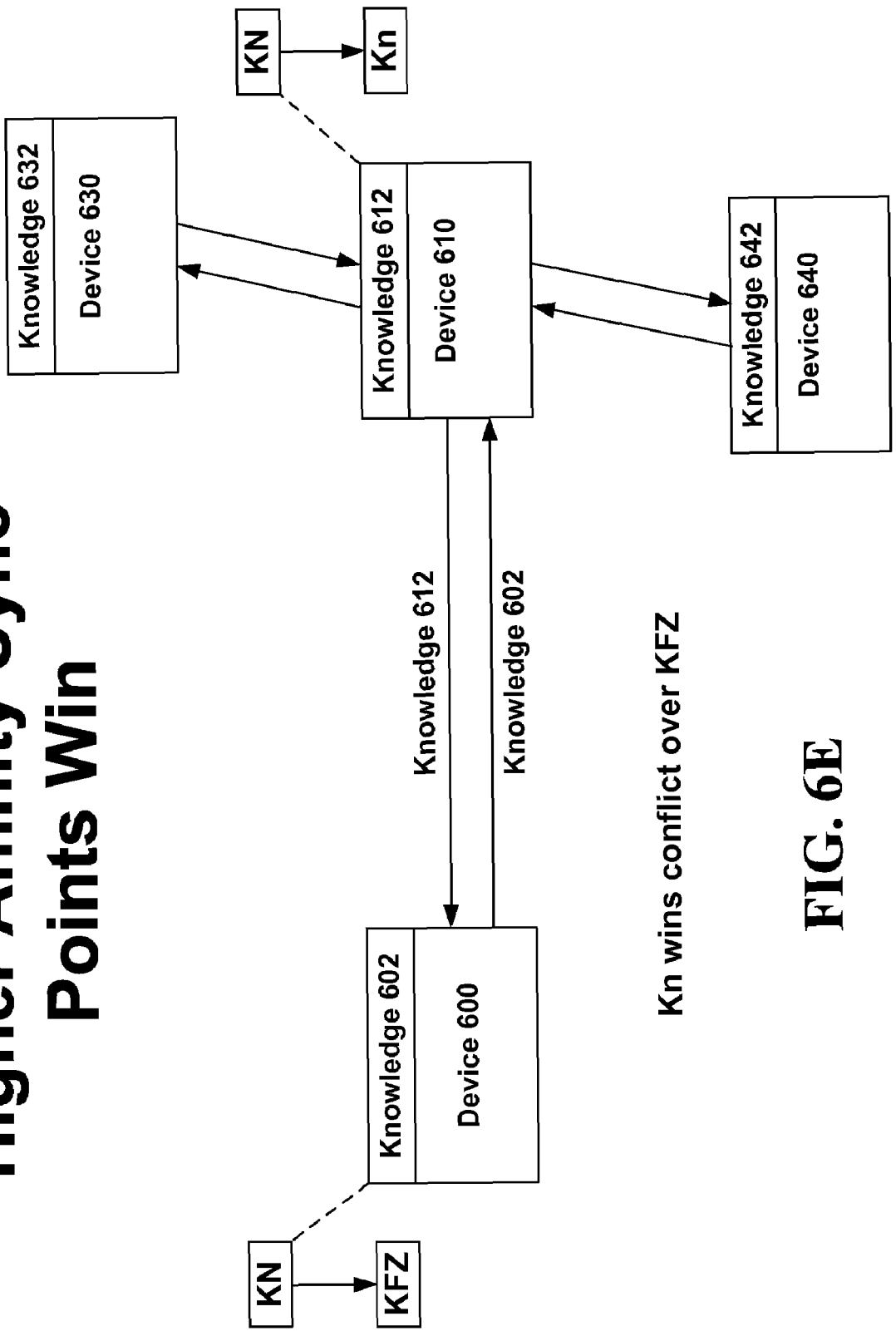

Yet another policy for conflict resolution that can be applied in accordance with the invention is shown in FIG. 6E. In this case, there are four devices 600, 610, 630 and 640 with knowledge 602, 612, 632 and 642. In this scenario, conflicts are resolved according to the highest affinity synchronization nodes, i.e., the nodes that are connected to the highest number of other nodes. Such a policy disfavors end points that synchronize with only one or a few different nodes as compared to nodes that synchronize with a higher number of nodes. For instance, as shown in FIG. 6E, the two nodes 600 and 610 independent evolve copies of an object KN being synchronized to KFZ and Kn, respectively. Since device 610 synchronizes with three devices 600, 630 and 640 whereas device 600 synchronizes only with one other device 610, according to this policy, the conflict with respect to object KN is resolved in favor of device 610. Such a highest affinity measure may be used to gauge the importance associated with an end-point.

Figure 6F:
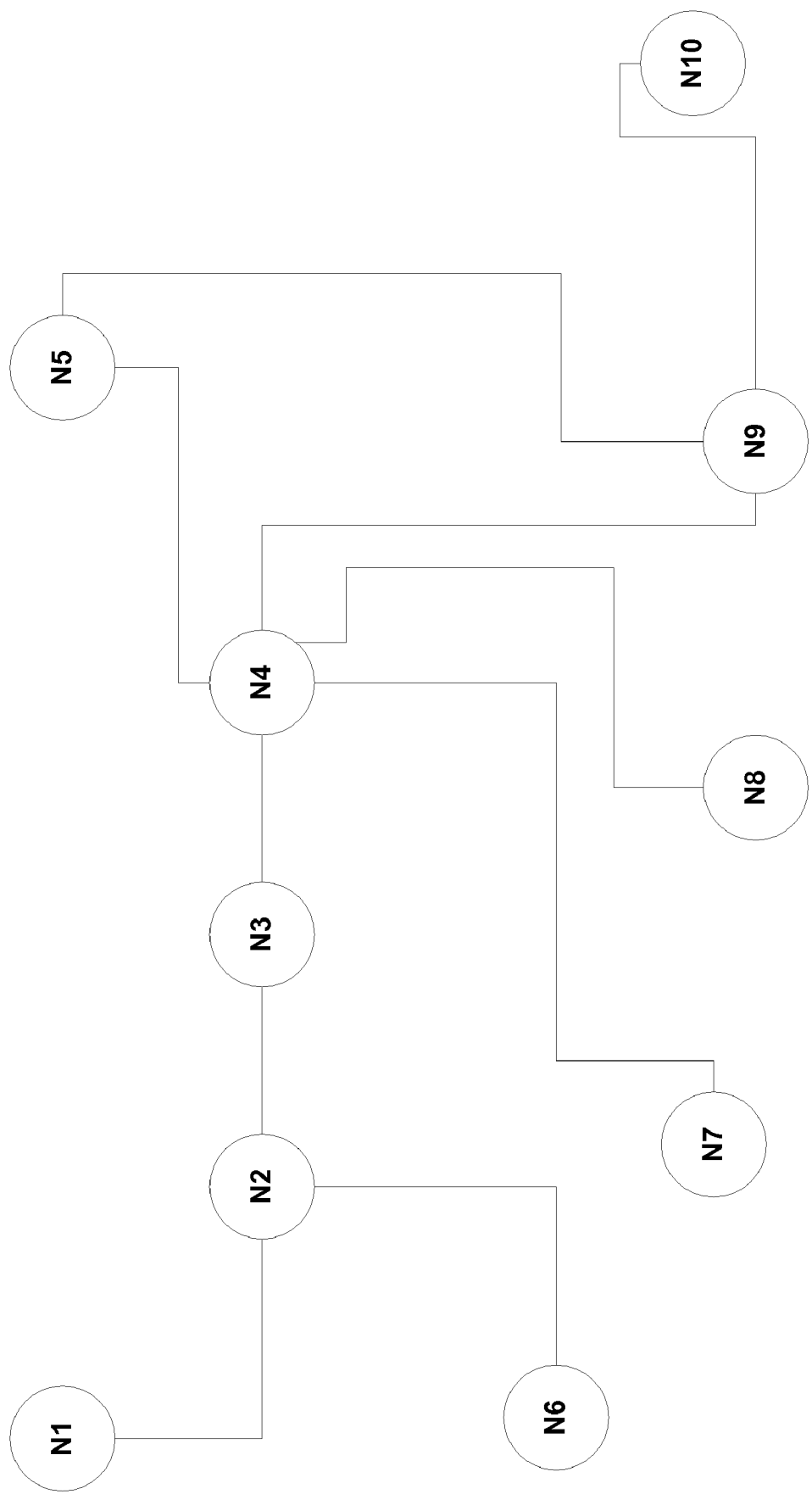

Still another exemplary non-limiting embodiment for resolving conflicts during a knowledge exchange in accordance with the invention is illustrated in FIG. 6F with respect to a synchronizing network of nodes N1, N2, N3, N4, N5, N6, N7, N8, N9 and N10. To resolve conflicts according to this scenario, a principle of highest centrality closeness is applied wherein the degree to which an end-point is close to all other end-points across all sync-relationships for a set of devices is measured. Highest centrality closeness identifies end-points with larger information networks and can be calculated by taking the inverse of the sum of the shortest paths between an end-point and all other endpoints. Overall, the closer a device is to all other end-points, the greater the weight or priority applied to the device when resolving conflicts. For instance, suppose node N3 and node N9 require conflict resolution. In this case, N3 is connected directly to only two other nodes N2 and N4, whereas node N9 is connected to three nodes N4, N5 and N10. Under the principles of highest affinity described in connection with FIG. 6E, node N9 would be selected as the conflict winner. However, the result changes when highest centrality closeness is applied since, without even performing the calculation, one can observe that node N3 is closer to all other nodes than node N9. An exemplary non-limiting measurement of this may be performed as follows.

With respect to node N3, the distance to node N1 is 2 nodes away, the distance to node N2 is 1 node away, the distance to node N4 is 1 node away, the distance to node N5 is 2 nodes away, the distance to node N6 is 2 nodes away, the distance to node N7 is 2 nodes away, the distance to node N8 is 2 nodes away, the distance to node N9 is 2 nodes away and the distance to node N10 is 3 nodes away. Adding up these distances yields a total distance of 18 nodes to all other nodes. Performing the same calculation for node N9, the distance to node N1 is 4 nodes away, the distance to node N2 is 3 nodes away, the distance to node N3 is 2 nodes away, the distance to node N4 is 1 node away, the distance to node N5 is 1 node away, the distance to node N6 is 4 nodes away, the distance to node N7 is 2 nodes away, the distance to node N8 is 2 nodes away and the distance to node N10 is 1 node away. Adding up these distance yields a total distance of 20 nodes. Accordingly, N3 wins the conflict over N9. Other measurements or proxies for highest centrality closeness may also be applied. For instance, to save measurement time, only the nodes at the edge of the network may be considered, which, in FIG. 6F, includes N1, N6, N7, N8 and N10, i.e., the devices connected to only one other node.

Figure 7:
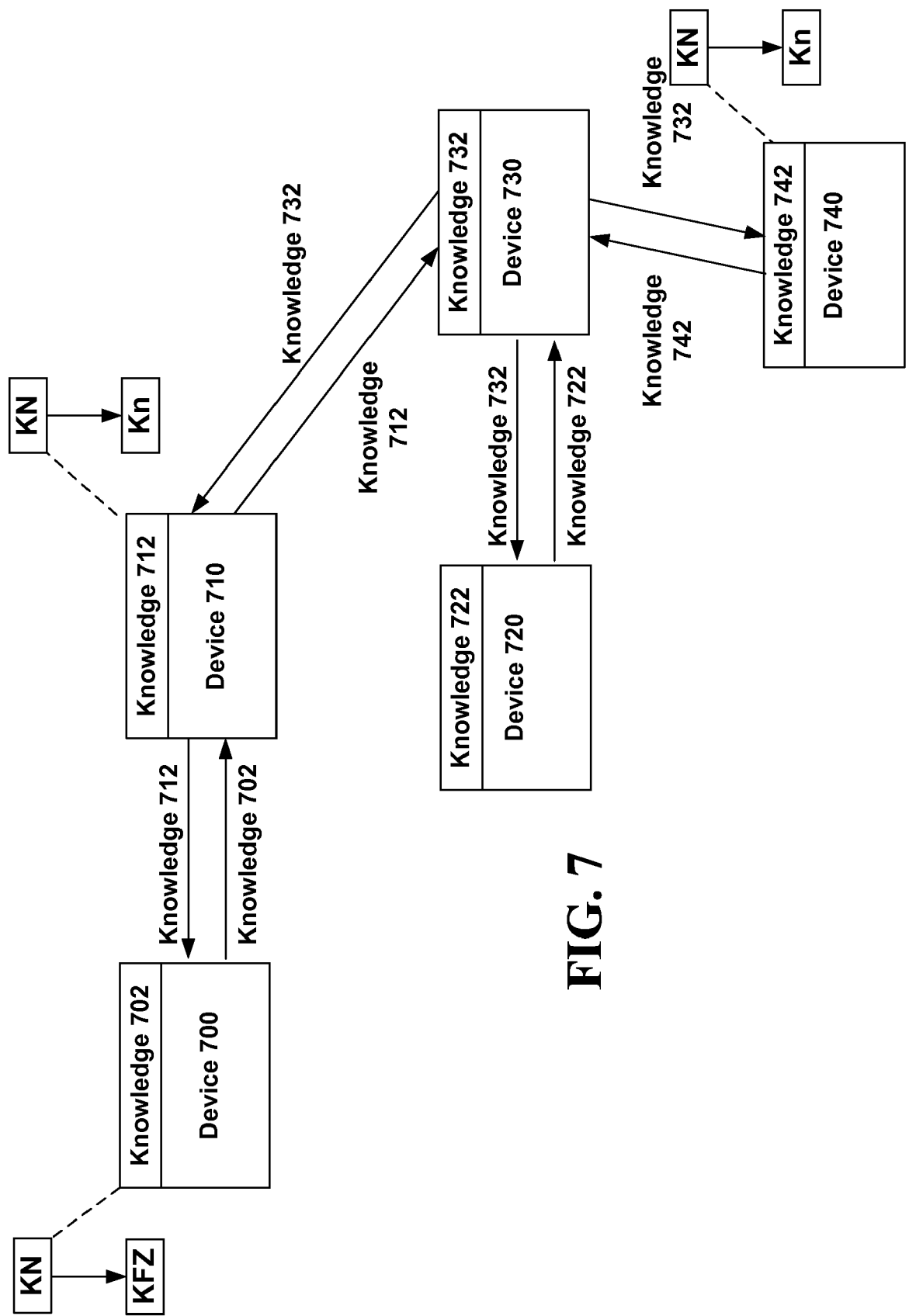
FIG. 7 is an exemplary non-limiting block diagram showing a traffic-based synchronization conflict resolution policy that may be implemented by a device in accordance with the invention.

FIG. 7 illustrates yet another way to handle conflicts in accordance with a traffic-based policy, i.e., conflicts are resolved in a way that minimizes the amount of traffic on the network. For instance, in the example of FIG. 7, there are five devices 700, 710, 720, 730 and 740 having knowledge 702, 712, 722, 732 and 742, respectively, synchronizing according to the topology shown. In this example, object KN is evolved by device 700 to KFZ and object KN is independently evolved by device 740 and 710 to Kn. In this embodiment, a traffic-based analysis is performed whereby it is determined whether selecting KFZ or Kn resolves the conflict with the minimum impact on network traffic. In this example, less synchronization traffic is implicated by resolving the conflict in favor of version Kn since changes need only be propagated to three different devices 700, 720 and 730 whereas to adopt version KFZ requires propagation to all of the other devices.

Figure 8:
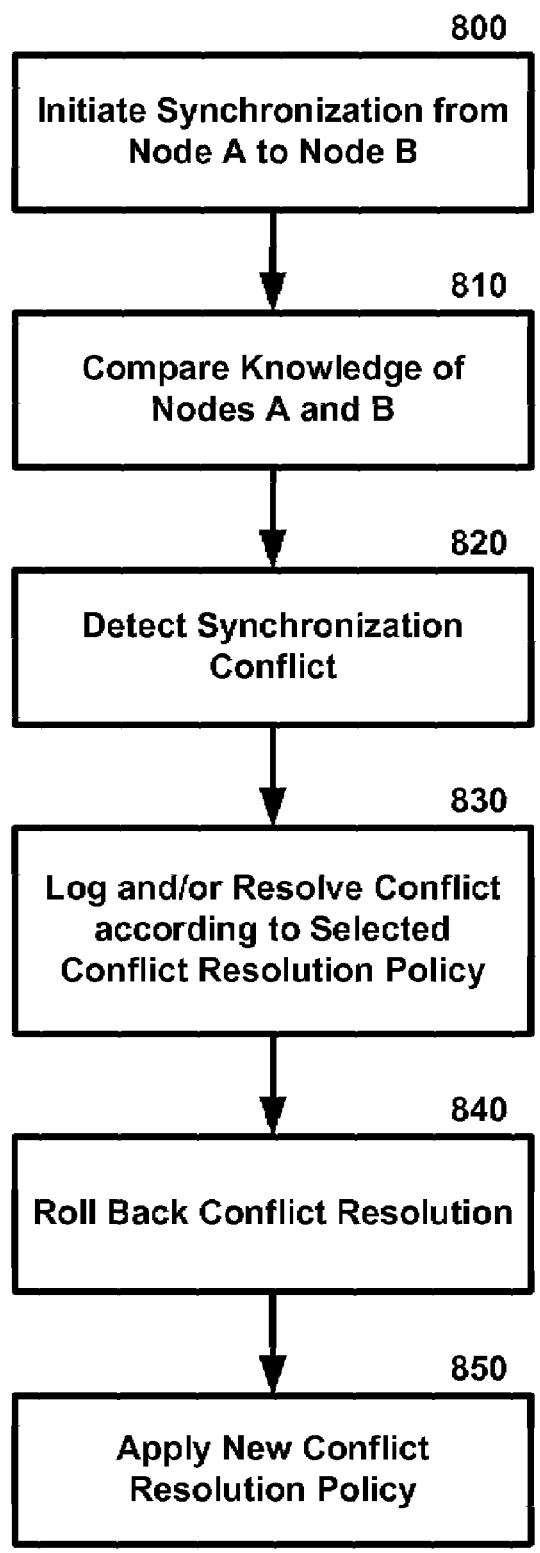
FIG. 8 is an exemplary non-limiting flow diagram showing the initiation of synchronization among a set of devices, and corresponding detection and resolution of any conflict in accordance with various embodiments of the invention.

FIG. 8 is an exemplary non-limiting flow diagram showing the initiation of synchronization among a set of devices, and corresponding conflict detection and resolution according to the invention. At 800, synchronization is initiated between two nodes A and B of set of synchronizing nodes. At 810, the knowledge of the two nodes A and B is compared. At 820, any conflicts that are discovered during synchronization are detected. At 830, the conflicts are optionally stored in a conflict log for later resolution and/or to roll back changes and conflict resolution to earlier times. If not logged for later, at 830, the conflicts are resolved according to the conflict resolution policy or policies selected by the synchronizing device (e.g., the user or an application). At 840, optionally the conflict resolution can be rolled back to an earlier point in time. At 850, alternative conflict resolution policies may be applied moving forward.

Thus, in accordance with the invention, a variety of conflict resolution policies may be applied, alone or in combination, to determine which node trumps the other node in the event of a conflict. If independent versioning is OK, or desirable, no conflict resolution is another option.

In sum, the proliferation of new end-points and data types being synchronized beyond email are going to require new conflict resolution policies that are flexible enough for ever evolving synchronization scenarios. Some conflict resolution policies identified herein include: (A) "Most Frequent Updater" wherein the end-point that has performed the most updates since the last synchronization wins, (B) "Priority", wherein end-points are assigned priorities and those priorities are used to determine a winner, (C) "% Change" wherein replicas with the highest percentage of change win, (D) "Deadlock Resolution" wherein an arbiter is chosen to determine a winner for conflicts that cannot be resolved, (E) "Highest Degree" wherein end-points participating in the largest number of sync-relationships wins and (F) "Highest Centrality Closeness" wherein the degree an end-point is close to all other end-points across all sync-relationships is measured.

Some of the resolution policies mentioned above are non-traditional and assuming that an application using the synchronization capabilities of the present invention adheres to a set of patterns, any of these policies can be applied without losing the ability to leverage the conflict resolution features provided by the invention. Specifically, applications are allowed to defer conflict resolution or automatically resolve conflicts using the policy provided. In the case of deferral, a client will be given conflict information to store, which in one exemplary, non-limiting embodiment, includes the item version, data and knowledge vector that would be learned if the change were to be applied. Then, clients can, at a later time, enumerate through these conflicts. Thus, advantageously, the invention enables the enumeration of stored conflicts, per item knowledge stored with a conflict and the ability to apply custom conflict resolution policies.

The systems and methods for resolving conflicts of the invention may also be applied to the context of resolving in memory data on the same provider. In such context, the in memory data may not be backed by a physical store, e.g., it might be used in a graph solver on the CPU to synchronize nodes. The invention may also be applied in the context of scene graphs, especially as they become more distributed on multi-core architectures and calculations are written directly to an in memory data structure such as a volumetric texture.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with detecting and resolving synchronization conflicts in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for detecting and resolving synchronization conflicts in accordance with the invention.

Figure 9:
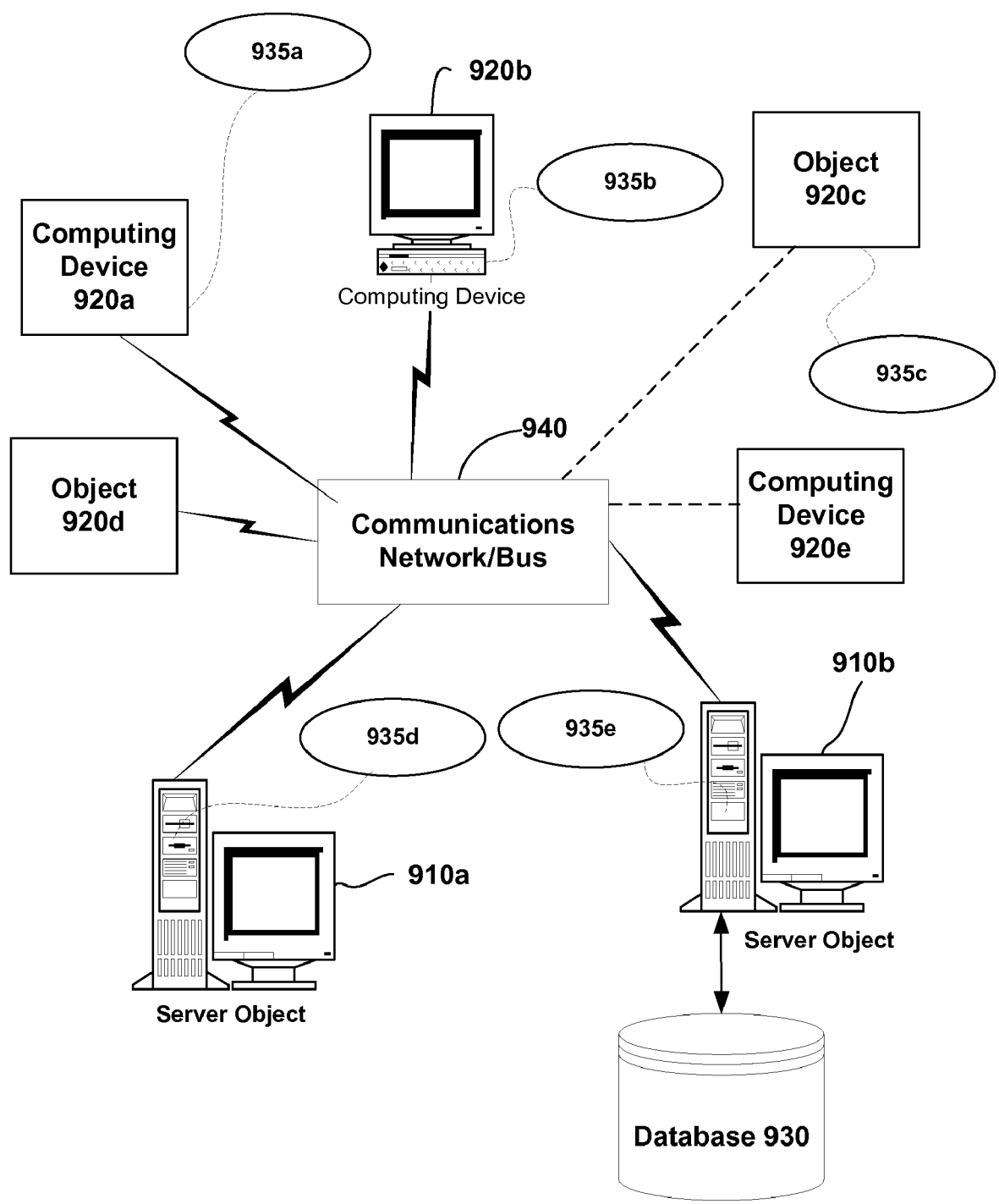
FIG. 9 is a block diagram representing an exemplary non-limiting networked environment in which the present invention may be implemented.

FIG. 9 provides a schematic diagram of an exemplary networked or distributed computing environment. The distributed computing environment comprises computing objects 910a, 910b, etc. and computing objects or devices 920a, 920b, 920c, 920d, 920e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 940. This network may itself comprise other computing objects and computing devices that provide services to the system of FIG. 9, and may itself represent multiple interconnected networks. In accordance with an aspect of the invention, each object 910a, 910b, etc. or 920a, 920b, 920c, 920d, 920e, etc. may contain an application that might make use of an API, or other object, software, firmware and/or hardware, suitable for use with the systems and methods for detecting and resolving synchronization conflicts in accordance with the invention.

It can also be appreciated that an object, such as 920c, may be hosted on another computing device 910a, 910b, etc. or 920a, 920b, 920c, 920d, 920e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the detecting and resolving of synchronization conflicts according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. In this regard, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 920a, 920b, 920c, 920d, 920e, etc. can be thought of as clients and computers 910a, 910b, etc. can be thought of as servers where servers 910a, 910b, etc. maintain the data that is then replicated to client computers 920a, 920b, 920c, 920d, 920e, etc., although any computer can be considered a client, a server, or both, depending on the circumstances. Any of these computing devices may be processing data or requesting services or tasks that may implicate the detection and resolution of synchronization conflicts in accordance with the invention.

A server is typically a remote computer system accessible over a remote or local network, such as the Internet or wireless network infrastructures. The client process may be active in a first computer system, and the server process may be active in a second computer system, communicating with one another over any of a variety of communications media, thus providing distributed functionality and allowing multiple clients to take advantage of the information-gathering capabilities of the server. Any software objects utilized pursuant to the techniques for detecting and resolving synchronization conflicts in accordance with the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present invention may be employed. In more detail, a number of servers 910a, 910b, etc. are interconnected via a communications network/bus 940, which may be a LAN, WAN, intranet, GSM network, the Internet, etc., with a number of client or remote computing devices 920a, 920b, 920c, 920d, 920e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to synchronize data with one or more devices of a set of networked devices.

In a network environment in which the communications network/bus 940 is the Internet, for example, the servers 910a, 910b, etc. can be Web servers with which the clients 920a, 920b, 920c, 920d, 920e, etc. communicate via any of a number of known protocols such as HTTP. Servers 910a, 910b, etc. may also serve as clients 920a, 920b, 920c, 920d, 920e, etc., as may be characteristic of a distributed computing environment.

Also, communications may be wired or wireless, or a combination, where appropriate. Client devices 920a, 920b, 920c, 920d, 920e, etc. may or may not communicate via communications network/bus 14, and may have independent communications associated therewith. For example, in the case of a TV or VCR, there may or may not be a networked aspect to the control thereof. Each client computer 920a, 920b, 920c, 920d, 920e, etc. and server computer 910a, 910b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 910a, 910b, 920a, 920b, 920c, 920d, 920e, etc. may be responsible for the maintenance and updating of a database 930 or other storage element, such as a database or memory 930 for storing data processed or saved according to the invention. Thus, the present invention can be utilized in a computer network environment having client computers 920a, 920b, 920c, 920d, 920e, etc. that can access and interact with a computer network/bus 940 and server computers 910a, 910b, etc. that may interact with client computers 920a, 920b, 920c, 920d, 920e, etc. and other like devices, and databases 930.

Exemplary Computing Device

Figure 10:
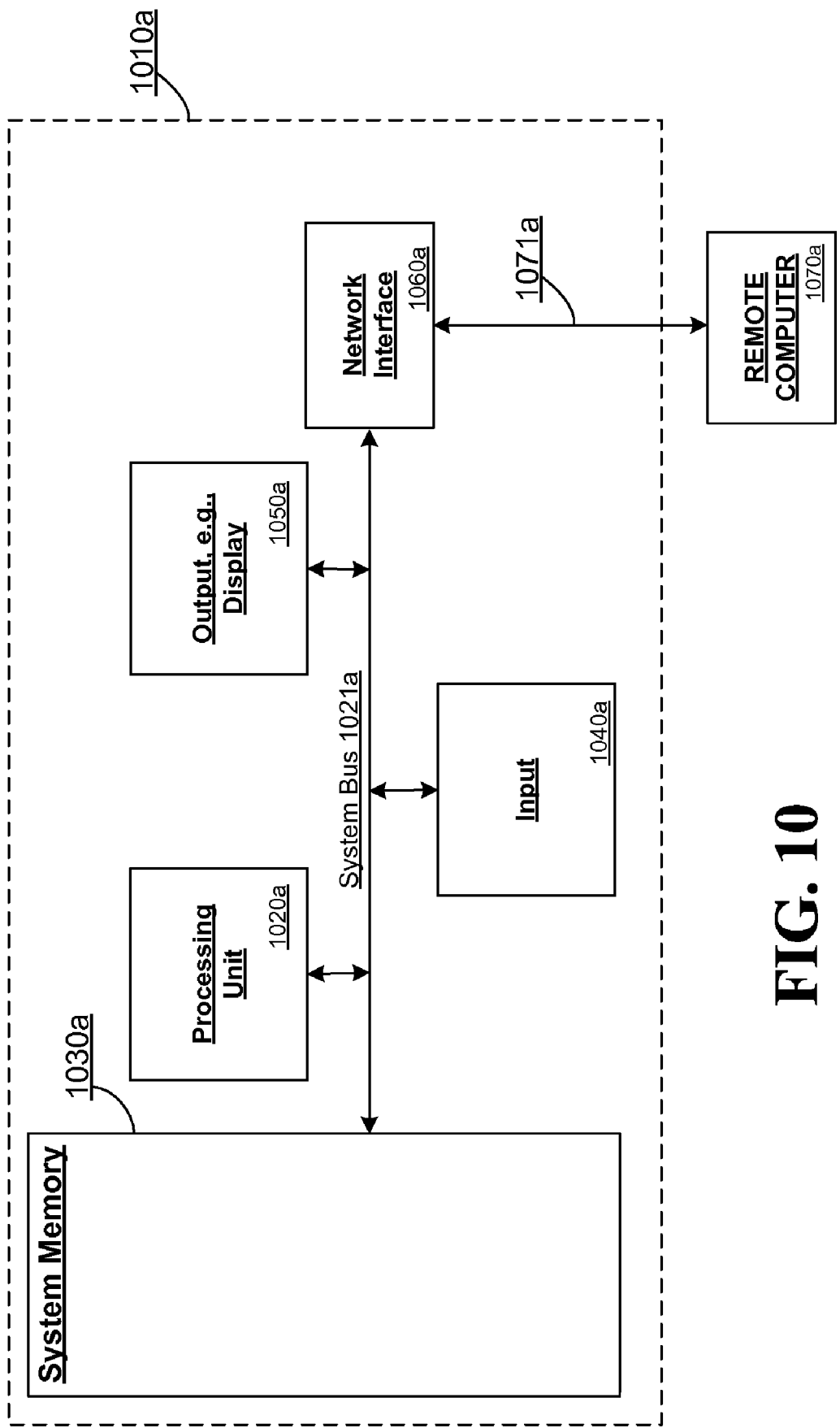
FIG. 10 is a block diagram representing an exemplary non-limiting computing system or operating environment in which the present invention may be implemented.

As mentioned, the invention applies to any device wherein it may be desirable to synchronize data across a set of devices. It should be understood, therefore, that handheld, portable and other computing devices and computing objects of all kinds are contemplated for use in connection with the present invention, i.e., anywhere that a device may synchronize or otherwise receive, process or store synchronization data. Accordingly, the below general purpose remote computer described below in FIG. 10 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 10 thus illustrates an example of a suitable computing system environment 1000a in which the invention may be implemented, although as made clear above, the computing system environment 1000a is only one example of a suitable computing environment for a media device and is not intended to suggest any limitation as to the scope of use or functionality of the invention. Neither should the computing environment 1000a be interpreted as having any dependency or requirement relating to any one or combination of components illustrated in the exemplary operating environment 1000a.

With reference to FIG. 10, an exemplary remote device for implementing the invention includes a general purpose computing device in the form of a computer 1010a. Components of computer 1010a may include, but are not limited to, a processing unit 1020a, a system memory 1030a, and a system bus 1021a that couples various system components including the system memory to the processing unit 1020a. The system bus 1021a may be any of several types of bus structures including a memory bus or memory controller, a peripheral bus, and a local bus using any of a variety of bus architectures.

Computer 1010a typically includes a variety of computer readable media. Computer readable media can be any available media that can be accessed by computer 1010a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010a. Communication media typically embodies computer readable instructions, data structures, program modules or other data in a modulated data signal such as a carrier wave or other transport mechanism and includes any information delivery media.

The system memory 1030a may include computer storage media in the form of volatile and/or nonvolatile memory such as read only memory (ROM) and/or random access memory (RAM). A basic input/output system (BIOS), containing the basic routines that help to transfer information between elements within computer 1010a, such as during start-up, may be stored in memory 1030a. Memory 1030a typically also contains data and/or program modules that are immediately accessible to and/or presently being operated on by processing unit 1020a. By way of example, and not limitation, memory 1030a may also include an operating system, application programs, other program modules, and program data.

The computer 1010a may also include other removable/non-removable, volatile/nonvolatile computer storage media. For example, computer 1010a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021a through a non-removable memory interface such as an interface, and a magnetic disk drive or optical disk drive is typically connected to the system bus 1021a by a removable memory interface, such as an interface.

A user may enter commands and information into the computer 1010a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020a through user input 1040a and associated interface (s) that are coupled to the system bus 1021a, but may be connected by other interface and bus structures, such as a parallel port, game port or a universal serial bus (USB). A graphics subsystem may also be connected to the system bus 1021a. A monitor or other type of display device is also connected to the system bus 1021a via an interface, such as output interface 1050a, which may in turn communicate with video memory. In addition to a monitor, computers may also include other peripheral output devices such as speakers and a printer, which may be connected through output interface 1050a.

The computer 1010a may operate in a networked or distributed environment using logical connections to one or more other remote computers, such as remote computer 1070a, which may in turn have media capabilities different from device 1010a. The remote computer 1070a may be a personal computer, a server, a router, a network PC, a peer device or other common network node, or any other remote media consumption or transmission device, and may include any or all of the elements described above relative to the computer 1010a. The logical connections depicted in FIG. 10 include a network 1071a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1010a is connected to the LAN 1071a through a network interface 1060a or adapter. When used in a WAN networking environment, the computer 1010a typically includes a communications component, such as a modem, or other means for establishing communications over the WAN, such as the Internet. A communications component, such as a modem, which may be internal or external, may be connected to the system bus 1021a via the user input interface of input 1040a, or other appropriate mechanism. In a networked environment, program modules depicted relative to the computer 1010a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for detecting and resolving synchronization conflicts in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for detection and resolution of synchronization conflicts in accordance with the invention. The invention contemplates the use of the invention from the standpoint of an API (or other software object), as well as from a software or hardware object that performs synchronization operations in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to synchronize among a set of loosely coupled devices. For instance, the detection and resolution of synchronization conflicts in accordance with the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the synchronization and conflict resolution capabilities of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 2A, 3, 4A, 4B, 4C, 4D, 5A, 5B, 5C, 5D, 6A, 6B, 6C, 6D, 6E, 6F, 7 and 8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for detecting and resolving conflicts in accordance with the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for synchronizing a set of objects between a first node and a second node of a plurality of nodes connectable via one or more networks, comprising:
employing a processor to execute computer executable instructions stored on a computer readable medium to perform the following acts:
initiating synchronization of the set of objects between the first node and the second node;
comparing knowledge of the second node concerning the set of objects with knowledge of the first node concerning the set of objects including determining that a conflict exists with respect to respective versions of at least one object of the set of objects maintained by the first and second node;
resolving the conflict by selecting one of the versions to propagate to the plurality of nodes with reference to at least one conflict resolution policy configurable by the first, or second node from a set of conflict resolution policies;
wherein said resolving includes resolving the conflict by selecting one of the versions to propagate to the plurality of nodes with reference to a conflict resolution policy that favors the version originating from the node that has performed the most updates since the last synchronization;
enabling each node to communicate with a database of directives and independently executing the directives wherein the directives include at least one conflict resolution policy.

2. The method of claim 1, wherein said determining includes detecting from the knowledge of the second node and the first node whether an object of the set of objects independently evolved on the first node and second node.

3. The method of claim 1, wherein said resolving includes resolving the conflict by selecting one of the versions to propagate to the plurality of nodes with reference to a conflict resolution policy that favors the version originating from the node having the highest priority.

4. The method of claim 1, wherein resolving includes resolving the conflict by selecting one of the versions to propagate to the plurality of nodes with reference to a conflict resolution policy that favors the version originating from the node that has made the highest percentage of changes to the at least one object.

5. The method of claim 1, wherein said resolving includes resolving the conflict by selecting one of the versions to propagate to the plurality of nodes with reference to an arbiter that determines the version to propagate on behalf of the first and second node.

6. The method of claim 1, wherein said resolving includes resolving the conflict by selecting one of the versions to propagate to the plurality of nodes with reference to a conflict resolution policy that favors the version originating from the node that participates in the higher number of synchronization relationships with the plurality of nodes.

7. The method of claim 1, wherein said resolving includes resolving the conflict by selecting one of the versions to propagate to the plurality of nodes with reference to a conflict resolution policy that favors the version originating from the node that is closest to all other nodes as measured across all synchronization relationships of the plurality of nodes.

8. The method of claim 1, further comprising:
initiating synchronization by the first node or the second node with a third node;
comparing knowledge of the third node with knowledge of the first node or second node, respectively, concerning the set of objects including determining that a second conflict exists with respect to respective versions of at least one object of the set of objects maintained by the third node and the first or second node; and
resolving the second conflict by selecting one of the versions to propagate to the plurality of nodes with reference to at least one conflict resolution policy selected by the third node, or the first node or second node from a plurality of conflict resolution policies.

9. A first node of a plurality of nodes connectable via one or more networks that synchronizes a set of objects between the first node and any second node of the plurality of nodes, comprising:
a synchronization component that synchronizes the set of objects between the first node~any second node of the plurality of nodes, and detects whether at least conflict exists with respect to respective versions of at least one object of the set of objects maintained by the first and any second node;

a conflict log store that stores information representative of the at least one conflict;

a synchronization conflict resolution component that enables and executes the resolution of the at least one conflict by selecting one of the versions to propagate to the second node with reference to at least one conflict resolution policy selected by the first node from a plurality of conflict resolution policies; and wherein said synchronization conflict resolution component resolves the at least one conflict by selecting one of the versions to propagate to the second node with reference to a conflict resolution policy that favors the version originating from the node that has made the highest percentage of changes to the at least one object;

a synchronization time control component allows an application or user of the first node to restore the at least one object to a time before the detection of the at least one conflict.

10. The first node of claim 9, wherein the synchronization time control component allows the application or user to restore the set of objects of the first node to a designated point in time, thereby rolling back any conflict resolution performed on the set of objects by the synchronization conflict resolution component after the designated point in time.

11. The first node of claim 10, wherein the synchronization time control component allows the application or user to apply a different at least one conflict resolution policy of the plurality of conflict resolution policies at the designated point in time, resolving any conflicts from the designated point in time with reference to the different at least one conflict resolution policy.

12. The first node of claim 9, wherein said synchronization conflict resolution component resolves the at least one conflict by selecting one of the versions to propagate to the second node with reference to a conflict resolution policy that favors the version originating from the node that has performed the most updates since the last synchronization.

13. The first node of claim 9, wherein said synchronization conflict resolution component resolves the at least one conflict by selecting one of the versions to propagate to the second node with reference to a conflict resolution policy that favors the version originating from the node having the highest priority.

14. The first node of claim 9, wherein said synchronization conflict resolution component resolves the at least one conflict by selecting one of the versions to propagate to the second node with reference to an arbiter that determines the version to propagate on behalf of the first and second node.

15. The first node of claim 9, wherein said synchronization conflict resolution component resolves the at least one conflict by selecting one of the versions to propagate to the second node with reference to a conflict resolution policy that favors the version originating from the node that participates in the higher number of synchronization relationships with the plurality of nodes.

16. The first node of claim 9, wherein said synchronization conflict resolution component resolves the at least one conflict by selecting one of the versions to propagate to the second node with reference to a conflict resolution policy that favors the version originating from the node that is closest to all other nodes as measured across all synchronization relationships of the plurality of nodes.

17. The first node of claim 9, wherein said synchronization conflict resolution component resolves the at least one conflict by selecting one of the versions to propagate to the second node with reference to a conflict resolution policy that minimizes a measurement of network traffic across all the plurality of nodes.

18. A first node of a plurality of nodes connectable via one or more networks that synchronizes a set of objects between the first node and any second node of the plurality of nodes, comprising:

a synchronization component that synchronizes the set of objects between the first node any second node of the plurality of nodes by comparing knowledge of the second node concerning the set of objects with knowledge of the first node concerning the set of objects, wherein the synchronization component determines whether at least conflict exists with respect to respective versions of at least one object of the set of objects maintained by the first and any second node, and the resolution of any least conflict through communication with a database of at least one conflict resolution policy; and wherein said synchronization conflict resolution component resolves the at least one conflict by selecting one of the versions to propagate to the second node with reference to a conflict resolution policy that favors the version originating from the node that has made the highest percentage of changes to the at least one object;

a conflict log store that stores information representative of the at least one conflict so that the first node can defer resolving the at least one conflict as between the first and any second node at a later time.

* * * * *